United States Patent
Silvers et al.

(10) Patent No.: US 9,901,765 B2
(45) Date of Patent: *Feb. 27, 2018

(54) HYDRANT MONITORING SYSTEM AND METHOD

(71) Applicant: SILVERSMITH, INC., Gaylord, MI (US)

(72) Inventors: David Silvers, Mancelona, MI (US); John Pearson Smith, Grand Rapids, MI (US); Troy David Van Liere, Gaylord, MI (US); Kevin Alan Janka, Boyne Falls, MI (US)

(73) Assignee: SILVERSMITH, INC., Gaylord, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,547

(22) Filed: Apr. 21, 2017

(65) Prior Publication Data
US 2017/0216645 A1    Aug. 3, 2017

Related U.S. Application Data

(63) Continuation-in-part of application No. 15/363,831, filed on Nov. 29, 2016, now Pat. No. 9,837,008, (Continued)

(51) Int. Cl.
| | |
|---|---|
| *G08B 21/00* | (2006.01) |
| *A62C 37/50* | (2006.01) |
| *A62C 35/20* | (2006.01) |
| *E03B 9/06* | (2006.01) |
| *H04Q 9/00* | (2006.01) |
| *H04W 4/20* | (2018.01) |
| *H04W 40/02* | (2009.01) |

(Continued)

(52) U.S. Cl.
CPC ............... *A62C 37/50* (2013.01); *A62C 35/20* (2013.01); *E03B 9/06* (2013.01); *H04Q 9/00* (2013.01); *H04W 4/006* (2013.01); *H04W 4/20* (2013.01); *H04W 40/02* (2013.01); *G08C 2201/93* (2013.01); *H04Q 2209/40* (2013.01); *H04Q 2209/883* (2013.01); *H04W 84/22* (2013.01)

(58) Field of Classification Search
CPC ...... A62C 37/50; A62C 35/20; G08B 21/182; E03B 9/06
See application file for complete search history.

(56) References Cited

U.S. PATENT DOCUMENTS

| | | | |
|---|---|---|---|
| 5,377,906 A * | 1/1995 | Mason | A47G 29/1212 232/34 |
| 6,031,455 A | 2/2000 | Grube et al. | |

(Continued)

FOREIGN PATENT DOCUMENTS

CA        2154433 A1    1/1997

*Primary Examiner* — Ryan Sherwin
(74) *Attorney, Agent, or Firm* — McGarry Bair PC

(57) ABSTRACT

A device for detecting adverse events in a fire hydrant, the device comprising a housing configured to mount to an exterior of the fire hydrant, the housing having a surface in register with the exterior of the fire hydrant, the surface having an aperture therein, a cover enclosing the housing and mounted to the fire hydrant at the surface. The housing further includes a controller, a transceiver, and a water sensor.

40 Claims, 14 Drawing Sheets

Related U.S. Application Data which is a continuation of application No. 14/892,604, filed as application No. PCT/US2014/038747 on May 20, 2014.

(60) Provisional application No. 61/825,797, filed on May 21, 2013.

(51) Int. Cl.
*H04W 4/00* (2018.01)
*H04W 84/22* (2009.01)

(56) References Cited

U.S. PATENT DOCUMENTS

| | | |
|---|---|---|
| 6,390,027 B1 | 5/2002 | Lyons et al. |
| 6,816,072 B2 | 11/2004 | Zoratti |
| 6,842,430 B1 | 1/2005 | Melnik |
| 7,021,327 B2 * | 4/2006 | Creel .................. E03B 7/14 137/272 |
| 7,242,317 B2 | 7/2007 | Silvers |
| 7,983,869 B1 | 7/2011 | Hurley |
| 8,657,021 B1 | 2/2014 | Preta et al. |
| 8,997,777 B2 * | 4/2015 | Montague .............. A62C 35/20 137/281 |
| 9,315,973 B2 * | 4/2016 | Varman ................. E03B 9/06 |
| 9,388,554 B2 * | 7/2016 | Bost ..................... E03B 9/02 |
| 9,670,650 B2 | 6/2017 | Pinney et al. |
| 2005/0174245 A1 * | 8/2005 | Delaney ............. G01F 23/0007 340/584 |
| 2010/0295672 A1 | 11/2010 | Hyland et al. |
| 2011/0066297 A1 | 3/2011 | Saberi et al. |
| 2013/0036796 A1 | 2/2013 | Fleury, Jr. et al. |

* cited by examiner

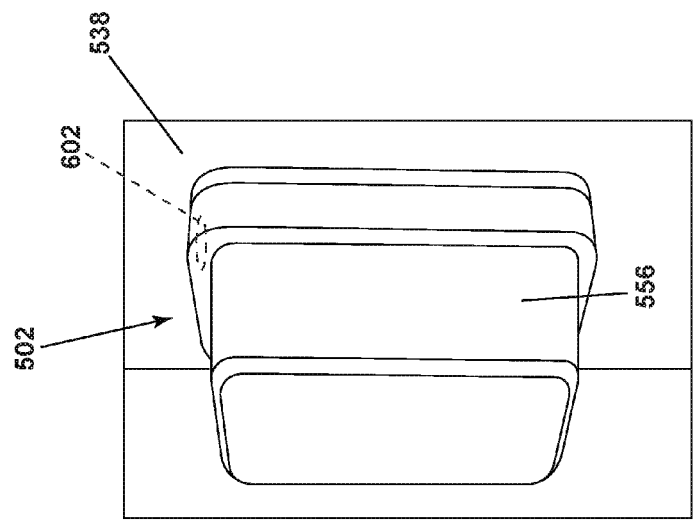
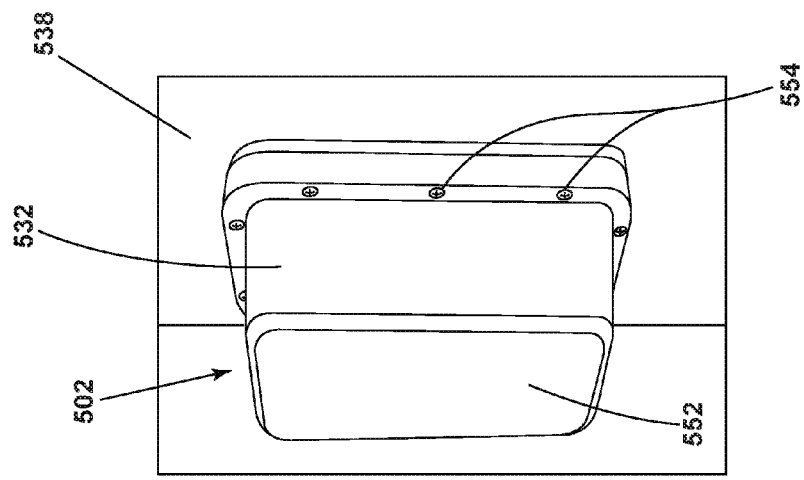
FIG. 15D
FIG. 15C

HYDRANT MONITORING SYSTEM AND METHOD

CROSS-REFERENCE TO RELATED APPLICATIONS

This application is a continuation-in-part application of application Ser. No. 15/363,831 filed on Nov. 29, 2016, now U.S. Pat. No. 9,837,008, issued Jan. 23, 2018, which is a continuation application of application Ser. No. 14/892,604 filed on Nov. 20, 2015, which is a National Phase application of International Application No. PCT/US2014/038747, filed May 20, 2014, which claims the benefit of U.S. Provisional Patent Application Ser. No. 61/825,797, filed May 21, 2013, which is incorporated herein by reference in its entirety.

BACKGROUND OF THE INVENTION

Field of the Invention

This invention relates to remote monitoring and data collection of municipal infrastructure such as hydrants. In one of its aspects, the invention relates to a system and method of sensing and gathering data from hydrants. In another of its aspects, the invention relates to a radio frequency communications system that communicates sensed data relating to monitoring hydrants by transferring data packets along a predetermined route. In another of its aspects, the invention relates to monitoring and communication systems, such as for monitoring and reporting various parameters associated with remote data sensing of municipal infrastructure. In another of its aspects, the invention relates to a wireless radio frequency communication system for transferring commands and data between elements of an integrated data sensing and gathering system and a municipal monitor server. In yet another of its aspects, the invention relates to a method for wireless communication between remotely spaced data collecting units located at hydrants and remotely spaced data communicating units over predetermined paths. In still another of its aspects, the invention relates to a method for transferring commands and data between various geographically related data collecting and communicating units and a central control server using a wireless radio frequency system. The invention further relates to an internet protocol server, configured to receive datagrams for communicating with geographically dispersed communications and monitoring units. Further, the invention relates to detector-based monitoring of the fluid level and the nozzle caps of hydrants to generate data that is communicated by a radio frequency communications system to a central server. In another aspect the invention relates to a housing for a device having a surface in register with a fire hydrant, the surface having an aperture therein and a cover enclosing the housing and mounted to the fire hydrant at the surface, Description of the Related Art Collection of data relating to the sensed status or condition of urban, suburban or rural municipal infrastructure in a central location from remote sources is a common practice. The collection methods have evolved from manual collection and written reports to electronic reports gathered manually or electronically. Collection of data electronically in urban areas where wireless Internet access is abundant is common but is more difficult and expensive in suburban or rural areas where Internet access is unavailable or otherwise expensive to use.

A number of systems for electronic sensing and collection of data relating to the status of municipal infrastructure have been devised. For example, Canadian Patent Application No. 2,154,433 to Parisi et al. discloses a freeze and water detector for use in detecting frost or freezing temperatures and water accumulation in the lower part of a fire hydrant. The detector has a detector that includes a float and magnet combination, a thermostat and an electrical circuit to indicate the presence of water and near-freezing temperatures inside the fire hydrant. The reference discloses a visual indicator mounted in a casing on the exterior of the fire hydrant.

U.S. Patent Application No. 2010/0295672 to Hyland et al. discloses an infrastructure monitoring system. In one example, to provide real-time information to fire departments, pressure meters may be attached to a fire hydrant to monitor and report pressure losses throughout a water infrastructure system. In another example, a tamper detector such as a motion detector, a contact detector, a rotation detector, a touch detector, a proximity detector or a resistance detector may be provided on a fire hydrant to detect the presence of an object that may indicate tampering of the fire hydrant. When the tamper detector detects an event, the tamper detector may send a message to a processor that will relay the message to an operations center wirelessly for the evaluation.

U.S. Pat. No. 6,816,072 to Zoratti discloses a detection and signaling apparatus mountable to a fire hydrant and which includes a cap mountable on a discharge nozzle, a cap movement detector mounted to a discharge nozzle cap, and a transmitter for transmitting a tamper detection signal remotely from the fire hydrant. Movement of the cap relative to the fire hydrant activates the cap movement detector that generates an output signal. The transmitter sends an output signal received through an antenna located at a remote host such as a central utility site or an emergency response network. A pressure detector can also be coupled to the transmitter to sense water supply main pressure and water flow through the fire hydrant.

In addition, there have also been various disclosures in the area of multi-hop node-to-node communications system and methods. For example, U.S. Pat. No. 7,242,317 to Silvers discloses well data and production control commands transmitted from a customer server to gas and well monitors at remote locations with signals that hop from well monitor to well monitor through a radio frequency (RF) network.

U.S. Pat. No. 6,842,430 to Melnick discloses a packet-hopping wireless network for automatic building controls functions relating to lighting, HVAC and security in which data are communicated by transferring data packets from node-to-node over a common RF channel. Each of the individual nodes is preferably programmed to perform the step of comparing its own logical address to a routing logical address contained in each packet which it receives, and to either discard, re-transmit, or process the packet based upon the results of the comparison. The routing logical address contained in a received packet contains the full routing information required to route the packet from a sending node to a destination node along a communication path prescribed by the routing logical address.

All of the references discussed in this section are incorporated herein by reference in their entirety.

SUMMARY OF THE INVENTION

According to one aspect the present disclosure relates to a device for detecting adverse events in a fire hydrant, the device comprising a housing configured to mount to an exterior of the fire hydrant, the housing having a surface in register with the exterior of the fire hydrant, the surface having an aperture therein, a cover enclosing the housing and mounted to the fire hydrant at the surface, a controller located within the housing, a transceiver operably interconnected with the controller, the transceiver adapted to wirelessly transmit data collected by the device to a remote data collection center, and a water sensor extending from the aperture to an adjustable depth within the fire hydrant, the water sensor operably interconnected to the controller.

In another aspect the present disclosure relates to a fire hydrant comprising a housing configured to mount to an exterior of the fire hydrant, the housing having a surface in register with the fire hydrant, the surface having an aperture therein a cover enclosing the housing and mounted to the fire hydrant at the surface, and a water sensor extending from the housing through the aperture to an adjustable depth within the fire hydrant.

In yet another aspect the present disclosure relates to a fire hydrant comprising a housing configured to mount to an exterior of the fire hydrant, the housing having a surface in register with the fire hydrant, the surface having an aperture therein, a water sensor extending from the housing through the aperture to an adjustable depth within the fire hydrant, the water sensor having a spring rod within a bendable conduit configured to remain stationary when at the adjustable depth.

BRIEF DESCRIPTION OF THE DRAWINGS

The invention will now be described with reference to the accompanying drawings in which:

FIG. 15C is a perspective view of the device from FIG. 14B with another portion of the device partially assembled.

FIG. 15D is a perspective view of the device from FIG. 14C with another portion of the device fully assembled.

DESCRIPTION OF EMBODIMENTS OF THE INVENTION

Figure 1:
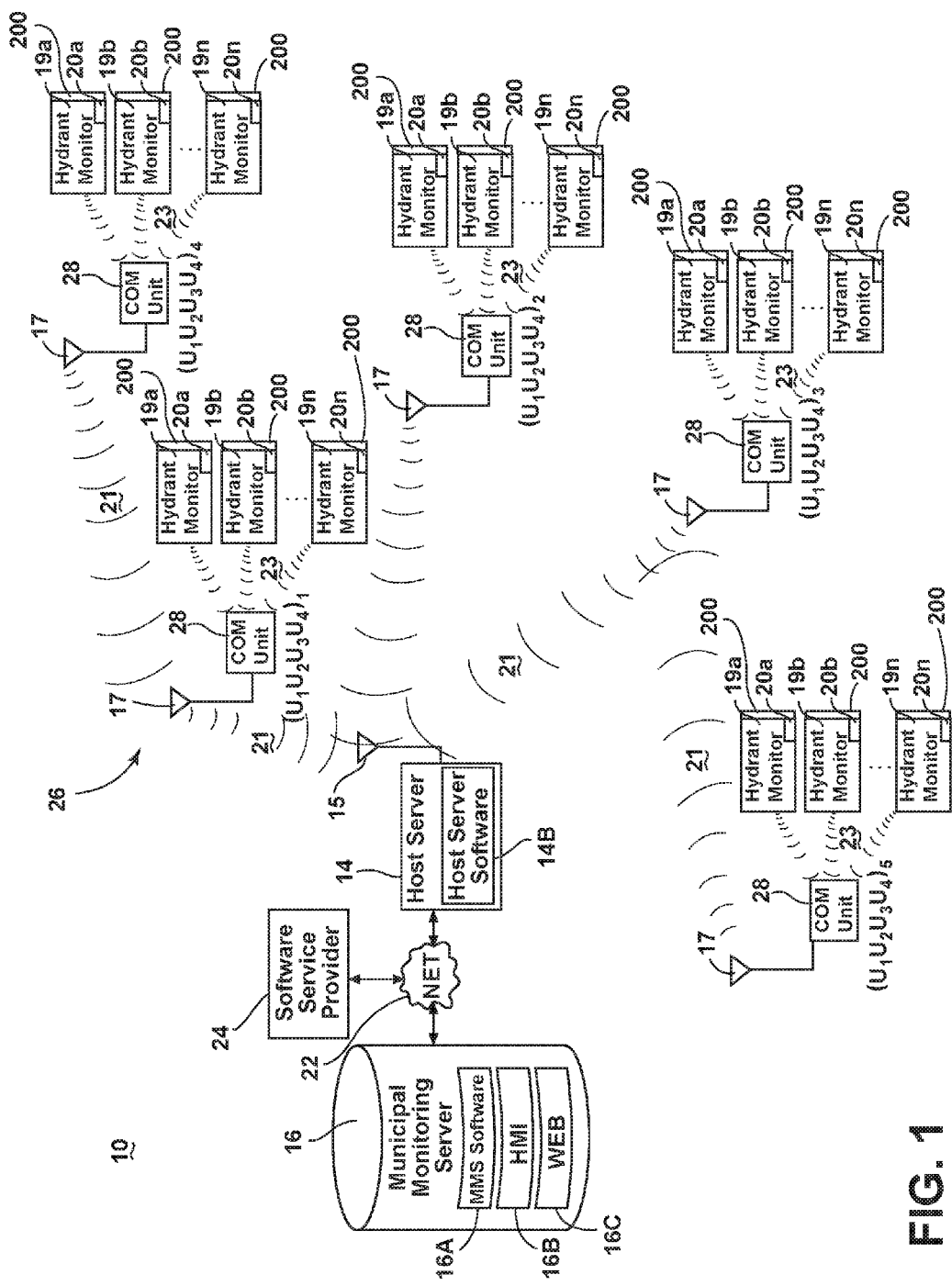
FIG. 1 is a schematic view of an example of a remote municipal monitoring system according to embodiments of the invention.

Referring to the drawings, and to FIG. 1 in particular, a method for collecting adverse event information from remote hydrants 200 to a municipal monitoring server 16 comprises: detecting an event in a hydrant 200 that may relate to an adverse hydrant condition; communicating data representative of the adverse condition to the municipal monitoring server 16 by routing the data at least in part along a predefined hopping path.

In one embodiment, the adverse data condition is first routed to a host server 14 through the predetermined hopping path and then the data representative of the adverse condition is transferred from the host server 14 to the municipal monitoring server 16, preferable through a network 22.

Further according to the invention, a system 10 for collecting data representative of events relating to an adverse condition in a fire hydrant 200 comprises a host server 14 configured to communicate data packets with a municipal monitoring server 16; at least one detector 20a-20n mounted to each of multiple fire hydrants that are remote from the municipal monitoring server 14; wherein each of the at least one detectors 20a-20n are configured to detect an event in the respective hydrant 200 of an adverse condition in the respective hydrant 200 and to generate an adverse event signal in response to the event. A hydrant monitor (19a-19n) is mounted on each of the fire hydrants 200 and connected to a respective detector 20a-20n for receiving a signal from each of the respective detector 20a-20n and configured to convert the adverse event signal from each of the respective detector 20a-20n into an event data packet and to wirelessly transmit the event data packet to one of a plurality of transmission communication units 28 positioned between each of the plurality of fire hydrants and the host server 14 through a predefined hopping path to transmit the event data packet to the host server 14 for sending the same to the municipal monitoring server 16.

The adverse events may include the removal of a nozzle cap 229 from the hydrant 200, the presence of fluid 238 in the hydrant (i.e. aberrant water in the hydrant 200), the presence of fluid 240 in the municipal system (i.e. water in the municipal system not in the hydrant 200), tampering of the hydrant or any other event that would render the hydrant 200 wholly or partially inoperative. The transmission communication units 28 are typically mounted to inaccessible structural supports, such as utility poles 210 or buildings. Each of the hydrants 200 can be geographically spaced from, but in wireless proximity to, at least one of the structural supports. In addition, each of the transmission communication units 28 are wirelessly proximate to at least one of the other transmission communication units 28 and at least one of the other transmission communication units 28 is in wireless communication with the host server 14. The monitors 19*a*-19*n* are typically battery powered and the hydrant monitors 19*a*-19*n* have a sleep mode. The hydrant monitors 19*a*-19*n* are configured to wake up in response to an adverse event signal from any of the detectors 20*a*-20*n* and to generate the adverse event signal into the event data packet and to transmit the data packet to one of the transmission communication units 28. In addition, the monitor may be awakened by a ping sent from the municipal monitoring server 16 to the monitors 19*a*-19*n* for a status check of all of the monitors 19*a*-19*n*. The pings can be sent to the monitors 19*a*-19*n* through the wireless hopping paths but in the reverse direction. To the extent that the monitors 19*a*-19*n* are still operative, the monitors 19*a*-19*n* are configured to send a reply to the municipal monitoring server 16 as to the status of each respective monitor.

FIG. 1 depicts an example of a hydrant monitoring system 10 comprising: a municipal monitoring location that includes a central data store or municipal monitoring server 16 with, multiple adverse event data collecting hydrant monitors 19*a*-19*n* and a system 26 for transporting data packets according to the invention between the hydrant monitors 19*a*-19*n* and the municipal monitoring server 16 in response to the detection of an adverse event condition by the hydrant monitor 19. The data transport system 26 typically operates in response to the detection of an adverse event by a hydrant monitor 19 to communicate data representative of the adverse event to the municipal monitoring server 16 from one of the hydrant monitors 19*a*-19*n*, which gather the data, and transmit the data to the municipal monitoring server 16. The municipal monitoring server 16 may include legacy hardware previously installed by a municipality wherein the hydrant monitoring system 10 is configured to interact with the legacy server. However, the municipal monitoring server 16 may be a dedicated server provided by a third party such as Silversmith and may be installed specifically as an element of the hydrant monitoring system. For the purposes of the disclosure herein, the server 16 shall be referred to as the "municipal monitoring server" without limitation to the provenance of the computing hardware and network infrastructure.

The municipal monitoring server 16 is typically geographically remote from the data collecting hydrant monitors 19*a*-19*n*. For example, a municipal monitoring server 16 may be located anywhere in a municipality and hydrant monitors 19*a*-19*n* may be located on every fire hydrant 200 within the municipality. In many cases, a collection of hydrant monitors 19*a*-19*n* will be geographically proximate to one another, for example, within 10 miles and/or within RF network proximity between one or more of each of the hydrant monitors 19*a*-19*n*. The data transport system 26 will be within geographic proximity to the hydrant monitors 19*a*-19*n*.

The data transport system 26 comprises a host server, 14 and multiple communication units 28, each of which may be communicatively connected to a respective hydrant monitor 19. Typically, a communications unit 28 can be connected to multiple hydrant monitors 19*a*-19*n* (represented in FIG. 1 as any number of hydrant monitors 19*a*, 19*b* . . . 19*n*) through a wireless or hard-wired communications link 23. Alternatively, a communications unit 28 may not be connected to any of the hydrant monitors 19*a*-19*n* and serve as a relay by communicatively coupling other communications units 28 or a remote communications unit 28 and the host server 14.

A software service provider 24 can be remotely connected to the host server 14 through the Internet for purposes of programming the host server software 14B during or subsequent to installation of the hydrant monitoring system 10.

The communications unit 28 is communicatively coupled via a communications link 23 to a hydrant monitor 19 that is configured to collect data related to the detection of an adverse condition at a geographically-spaced location. In a typical configuration, the communications unit 28 may be located at a utility pole and the host server 14 on a water tower. In general, communications units 28 have the ability to send radio frequency (RF) signals to one or more of the other communications units 28 via a transceiver 17 communicatively coupled and/or controlled by each communications unit 28. The communications units 28 have the ability to send RF signals to one or more of hydrant monitors 19*a*-19*n* and the other of the communications units 28. The communications unit 28 may include, in one embodiment, one or more suitable electronic components, such as processor(s), memory, baseband integrated circuits, electronic filters, and/or other electronics. In one embodiment, the electronic components may enable the communications unit 28 to at least receive communicative signals 21 via the transceiver 17, process the communication signals 21, provide information based upon the communication signals 21 to the hydrant monitor 19, and/or generate further communicative signals 21 to communicate with one or more other communications units 28 and/or the host server 14.

In certain embodiments, the communications units 28 may be geographically located in a manner where only a subset of the communications units 28 are proximal enough to the host server 14 to communicate directly with the host server 14 via communicative signals 21. Therefore, certain of the communications units 28 may be spatially far enough from the host server 14 so that direct communications between those communications units 28 and the host server 14 is not possible. However, the communications units 28 without a direct communication link to the host server 14 may be in a location where they can communicate with one or more communications units 28. It will be appreciated that the configuration depicted in FIG. 1 is an example and that the embodiments of this disclosure may include any number of communications units 28 that may communicate with one or more host servers, as well as, any number of communications units 28 that may not be proximal enough to the host server 14 to engage in direct communications with the host server 14. Each communications unit 28 can have a unique unit identification (ID) number, for example as shown in FIG. 1, a four digit number $U_1U_2U_3U_4$.

The hydrant monitor 19 may be configured to communicate adverse event data and/or information via the communications link 23 to the communications unit 28. Accordingly, data and/or information provided by a particular hydrant monitor 19 may be communicated from that hydrant monitor 19 to the communications unit 28 coupled by communications link 23 and then on to other associated communications units 28 or the host server 14 via RF communications links 21 from a communications transceiver 17. The hydrant monitors 19*a*-19*n* may have one or more detector 20*a*-20*n* configured to collect detector data and can communicate these data to the communications units 28 via the communications link 23. The one or more detector 20*a*-20*n* may be any suitable detector or detector suite, including but not limited to, voltage detectors, current detectors, image detectors, audio detectors, flow detectors, volume detectors, pressure detectors, temperature detectors, vibration detectors, motion detectors, magnetic field detectors, humidity detectors, access detectors, contact detectors, or the like. As described below, preferred detector 20a-20n may include a nozzle cap detector and a fluid level detector. The communications units 28 may be configured to receive the detector data indicative of the detection of an adverse event collected by the one or more detector 20a-20n, from the hydrant monitor 19 and generate one or more data packets incorporating the adverse event data, or portions thereof. The communications unit 28 may be further configured to transmit the data packet incorporating the adverse event data, or portions thereof, or other data to other communications units 28 and/or the host server 14.

In operation, adverse event data collected by the detector 20a-20n of the hydrant monitor 19 may be sent to the communications unit 28 and temporarily stored thereon. In other words, data collected on the hydrant monitors 19a-19n with their corresponding detector 20a-20n may be transmitted to the corresponding communications unit 28 via the corresponding communications link 23 in real-time or near real-time and stored in registers or memory associated with the communications unit 28. Further, the data may be received by the communications unit 28 on a repeated basis from the corresponding hydrant monitor 19 and stored in registers and memory thereon. In one embodiment, the data may further be removed, such as from memory and/or registers, from the communications unit 28 as it is communicated to other communications units 28 or the host server 14. In other embodiments of the invention, the data collected by the detector 20a-20n of a hydrant monitor 19 may be stored temporarily in registers or memory thereon before transferring to the corresponding communications unit 28 via communications link 23. In one embodiment, data may be temporarily stored to add hopping path information to the header and footer section of an event data packet.

In certain embodiments, the communications units 28 may communicate amongst themselves to communicate adverse event data back to the host server 14. As such, data transmitted from a hydrant monitor 19 may be communicated to the host server 14 via communications units 28 in a manner where, via a stored route, the data hops from one communications unit 28 to another communications unit 28, until the data is delivered to the host server 14.

Within the data transport system 26, the communications units 28 may be in close proximity of each other or they can be several miles apart. Groups of communications units 28 in a data transport system 26 are generally associated with one host server 14, but multiple host servers 14 can be employed depending on the size of the data transport system 26. Together, the communications units 28 and their corresponding host server 14 comprise a wireless radio frequency (RF) network and communicate using a 900 MHz, a 2.4 GHz, an Industrial, Scientific, or Medical (ISM), any no-license, or any other suitable frequency band. Radio wave communication is well-known and need not be described further. The host server 14 may have a conventional radio transceiver 15 for receiving radio signals from the communications units 28 and transmitting radio signals to the communications units 28. In addition, the host server 14 may have serial-to-IP converters (not shown) for converting Internet signals to RS-232 signals and vice versa. The host server 14 may further be communicatively coupled to a network 22, such as an Internet connection via, for example, satellite, cable modem, or the like. The host server 14 can collect radio signals from the communications units 28, convert them to Internet signals and transmit them to the municipal monitoring server 16 via the network 22. In other words, the host server 14 may communicate with the one or more communications units 28 using a first communications protocol and may further communicate with the municipal monitoring server 16 using a different protocol. In certain embodiments, the host server 14 may communicate with the communications units 28 using a communications unit hopping protocol as described herein and communicate with the municipal monitoring server 16 using transmission control protocol or Internet protocol (TCP/IP). Examples of serial-to-IP converters that may be used in host server 14 include a serial device server such as Lantronix UDS-10 available from Lantronix of Irvine, Calif., a standard Internet Connection (such as satellite, cable, DSL, etc.), a transceiver (such as a 900 MHz Radio and 900 MHz Antenna), various interconnecting cables (such as LMR200 and LMR400 cable and connectors), a housing (such as a 24×20×8 steel enclosure capable of withstanding severe environmental conditions), and a serial-to-IP converter, the use of which would be apparent to one skilled in the art.

The host server 14 may include one or more processors therein running host server software 14B to control the various constituent components of the host server 14 and coordinate communications with the communications units 28.

The municipal monitoring server 16 may include one or more processors with municipal monitoring server software 16A running thereon and one or more computer readable media to store the data received from the host server 14. Examples of servers and computer processors that are used at the municipal monitoring server 16 include, by illustration only and not by way of limitation: an Internet connection (satellite, cable, DSL, etc.), a suitable server computer, a web server, preferably containing a suitable database access connector (such as ODBC, SQL, mySQL, Oracle and the like), a website code such as SilverSmith Web code and automatic polling software such as SilverSmith TRaineAuto Service. In one aspect, the municipal monitoring server software 16A can coordinate communications between the municipal monitoring server 16 and a human machine interface (HMI) 16B or the World Wide Web connection 16C. The HMI 16B can be an end terminal that is local or remote to the municipal monitoring server 16, for accessing the municipal monitoring server 16 by a user of the transport system 26. The Web connection 16C can also be used by users to access the municipal monitoring server 16. Via the access points 16B and 16C, users may control the municipal monitoring server 16 to provide communications and monitor detected adverse event data from the hydrant monitors 19a-19n. The access points 16B and 16C can also be used to access historical municipal monitoring data stored on the municipal monitoring server 16.

In one embodiment, the municipal monitoring server software 16A running on the municipal monitoring server 16 can interact with the host server software 14B running on the host server 14 via the Internet 22 to receive data from and to provide instructions to the host server 14. Once the adverse event data are retrieved from the hydrant monitors 19a-19n, the host server 14 can transfer the adverse event data to the municipal monitoring server 16 using one or more open source or proprietary protocols. Examples of suitable protocols include TCP/IP, Modbus and DNP3. In other words, the host server 14 may strip the hopping path address from the event data packet. The event data packet is then sent to a user of the hydrant monitoring system 10 by way of the Internet 22 or any other suitable communication system. In one embodiment, the host server 14 may transmit the event data through the Internet 22 to the municipal monitoring server 16.

The software service provider 24 may be used to set up and/or configure the host server 14 and particularly the host server software 14B running thereon. In certain embodiments, the software service provider 24 may push the host server software 14B onto the host server 14. In other words, the host server 14 may be installed with the host server software 14B over the network 22. Furthermore, the host server software 14B may be configured over the network 22, with or without human involvement. In one aspect, the configuration and/or setup of the host server software 14B enables a user of the hydrant monitoring system 10 to use any suitable format or protocol of communications with the host server 14 of the user's choice. It will be appreciated that the configuration of the host server software 14B also enables seamless communications from the host server 14 to the municipal monitoring server 16. In other words, the host server software 14B may be configured by the software service provider 24 such that it can receive event data packets from one or more communications units 28, and generate a data packet based at least in part on the received event data packet that is in the format and/or protocols used by the municipal monitoring server 16.

Within the hydrant monitoring system 10, the communications units 28 communicate by "component hopping," wherein the communications units 28 transmit information in a series rather than each individual hydrant monitor 19 communicating directly with the host server 14. For example, in FIG. 1, if a hydrant monitor 19 in direct communication with communications unit 28 with ID $(U_1U_2U_3U_4)_4$ sends adverse condition data to the municipal monitoring server 16, the information is sent to communications unit 28 $(U_1U_2U_3U_4)_4$ which is then hopped on to communications unit 28 $(U_1U_2U_3U_4)_1$, then to the host server 14 and finally to the municipal monitoring server 16. The "component hopping" system permits efficient and expedient communication between communications units 28 and transmission of information to and from the associated communications units 28.

The protocol for transmission of information packets in the hydrant monitoring system 10 will now be described with reference to the flowchart of FIG. 2. Each hydrant monitor 19 stores route path data necessary for adverse event data generated at the hydrant to be communicated to the host server 14. The route path data contain details about the hopping path the event data packets for a hydrant must follow within the RF network in order to reach the host server 14.

Figure 2:
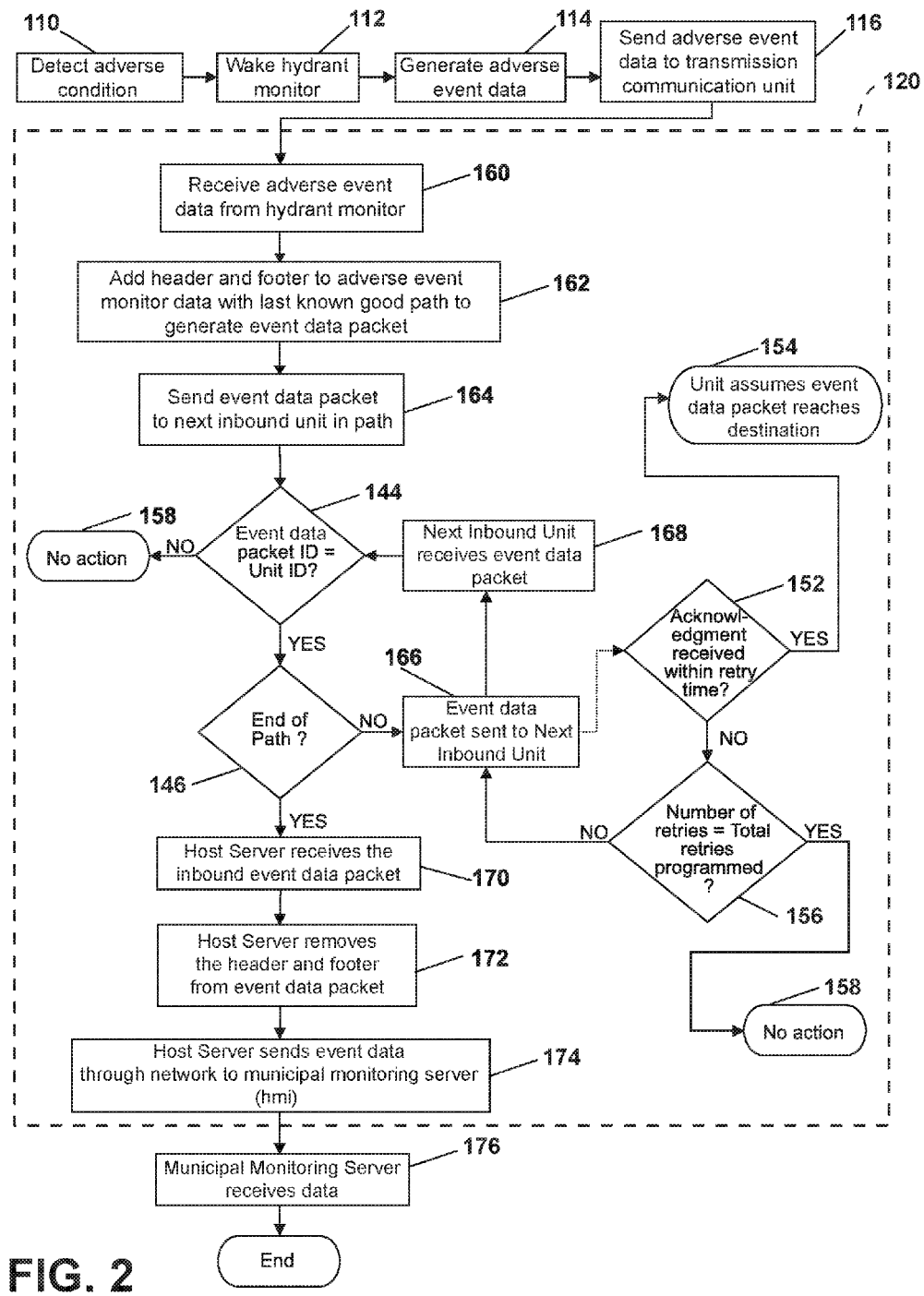
FIG. 2 is a flowchart depicting an example method of communication between a remote hydrant monitoring system and a municipal monitoring server in FIG. 1 in accordance with certain embodiments of the invention.

In FIG. 2, a method according to the invention for seamless wireless transport of data packets between a communications unit 28 that lies within a remote geographic region with multiple geographically proximate, data-collecting hydrant monitors 19a-19n and a municipal monitoring server 16 is contained within the dotted lines 120. Initially, the hydrant monitor 19 is in a low-power sleep mode. Upon detection of an adverse condition at block 110 in the hydrant by one of the hydrant detector 20a-20n, a trigger may wake the hydrant monitor at block 112. Once awake, the hydrant monitor may generate adverse event data at block 114. Example adverse event data may include information encoding the type of event detected, an identifier for the particular hydrant, a timestamp and a pre-programmed hopping path. At block 116, the hydrant monitor 19 may send the adverse event data to the communication unit 28 that is indicated by the pre-programmed hopping path.

The communications unit 28 indicated by the pre-programmed hopping path may receive the adverse event data at block 160. Then, at block 162, the communications unit 28 may generate an event data packet for transmission along the data transport system 26. An example of a format for an adverse event data packet formed by the communications unit 28 for transmission along the data transport system 26 is SS CC UUUU CCCC TT MM RRR . . . DDD . . . XXXX, wherein the each portion of the event data packet is as follows:

| EVENT PACKET | DESCRIPTION |
| --- | --- |
| SS | two digit start bit |
| CC | two digit control number |
| UUUU | four digit unit identification number of the next unit along path |
| CCCC | four digit company number |
| TT | two digit count of total hops required to reach the destination |
| MM | two digit count of hops made |
| RRR . . . | complete route path to reach the destination unit |
| DDD . . . | complete data from the hydrant monitor |
| XXXX | four digit cyclic redundancy check (CRC) |

The request packet control number will vary depending upon the native protocol of the municipal monitoring server 16. For example, the packet control number may end in an even digit, which instructs the communications units 28 that the packet is inbound with respect to the municipal monitoring server 16.

The DDD . . . portion of the event data packet can contain the adverse event data received by the communications unit 28 from the hydrant monitor 19. Finally, the four digit Cyclic Redundancy Check (CRC) at the end of the event data packet is the checksum of the bytes in the packet and is an error-detecting code used to verify that the entire packet has been transmitted correctly. If the bytes received by the communications units 28 does not sum to the CRC number, then destination unit such as the host server 14 knows that the packet is incomplete. The CRC check system is a successful and proven quality control tool. The event data packet can be of any format suitable for transmission through the hydrant monitoring system 10 and is not limited to the format described herein. It is only required that the event data packet contain the information necessary to reach the host server 14 and the municipal monitoring server 16.

Following the generation of the event data packet at block 162, the destination communications unit 28 may transmit the event data packet to the next inbound data communications unit 28 at block 164. The event data packet may travel through the RF network by component hopping such that the event data packet is sent along a predetermined path of communications units 28 until it arrives at the host server 14. In particular, the event data packet hops from communications unit 28 to communications unit 28 via processes at blocks 144, 146, 166, and 168, until it reaches the host server 14 at block 170. The communication unit 28 associated with the hydrant monitor 19 transmits the event data packets to the host server 14 using the component hopping mechanism enabled by the information encoded in the event data packet. The next inbound communications unit 28 receives the event data packet and may compare the unit ID in the event data packet to its own programmed unit ID at block 144. If the unit IDs do not match, no action is taken at block 158. If, however, the units IDs do match, then the unit determines whether the end of the predetermined path has been reached at block 146. This determination may be made by, for example, determining whether the number of hops made (MM) equals the total hops required to reach the destination unit (TT). If MM and TT are not equal, the current communications unit may change the unit ID in the event data packet to that of the next inbound communications unit, increase the number of hops made, and transmit the event data packet to the next inbound communications unit at block 166. Upon receipt of the event data packet by the next inbound unit at block 168, the same procedures may be followed by the next communications unit by comparing unit IDs at block 144 and comparing the number of hops made to the total number of hops required at block 146. These procedures are repeated until the event data packet reaches the host server at block 170 at which point, MM and TT are equal.

At block 172, the host server 14 may remove the header and footer from the event data packet. In one embodiment, the response datagram may incorporate the adverse event data and/or information that were transmitted from the hydrant monitor 19 to the communications unit 28 at block 116. In particular, the host server 14 can strip the hopping path from the event data packet to configure the event data to be transmitted via the network 22 via an appropriate network protocol, such as TCP/IP. At block 174, the host server 14 sends the event data via the host server 14 to the municipal monitoring server 16. When the municipal monitoring server 16 receives the event data at block 176, the event data may be read and stored. The transmission may be via Internet-based protocols, such as TCP/IP and over the network 22. In certain embodiments, the transmission may be secure and/or encrypted by any variety of encryption mechanisms. In this case, the transmission may be encrypted by the host server 14 by the host server software 14B and may require decryption at the municipal monitoring server software 16A.

As the event data packets are sent from one communications unit 28 to the next communications unit 28 in the transport system 26, the sending communications unit 28 waits for an acknowledgment that the next unit has received the event data packet at block 152. The acknowledgment is either receipt of the event data packet or the next unit's repeat. If the acknowledgment is obtained within a programmed retry time, then the sending communications unit 28 assumes at block 154 that the event data packet has reached its destination. However, if the acknowledgment is not received within a programmed retry time, then the sending unit compares the number of retries with a predetermined total number of allowed retries programmed in the unit at block 156. No action is taken if the number of retries equals the number programmed at block 158, but if the number of retries does not equal the number programmed, then the sending communications unit 28 again transmits at block 166 the event data packet to the next inbound communications unit 28.

The transport system 26 uses the Internet and RF bands as the main body of communication between components and remote locations. These communication methods are well known, robust, easily accessible, and cost effective. The "component hopping" serial arrangement is inherently efficient, permits facile communication between components clustered together or distant from each other within a field, and does not require complex equipment in order to transmit information to a remote location. Additionally, the system itself has several quality control functions, such as the CRC (as described above) and acknowledgment features, to ensure that communication, which includes commands for controlling in addition to monitoring components, between the components and the remote location is effectual and accurate. As a result, installation and repair of the system equipment requires less manpower, heavy machinery, time, and financial resources. Furthermore the system consumes a relatively low amount of power as the integrated communications module and controller of the communications unit 28 only need to communicate over short distances to adjacent communications units 28, rather than directly with the host server 14 enabling the use of lower power radio transmissions. Additional power savings are realized due to the relatively infrequent transmission of the adverse event data. Also, because of the relatively low power and infrequent radio transmissions, there is reduced radio traffic and congestion and therefore reduced probability of radio transmission interference.

When an event data packet is sent from the hydrant monitor 19, the communications unit 28 sets the total hops to 01 and the Next Inbound Unit identified in the UUUU segment, for example, in the form of:

| EVENT PACKET SEGMENT | SAMPLE PACKET DATA |
|---|---|
| SS | XX |
| CC | XX (even for event data packet) |
| UUUU | 0008 |
| CCCC | XXXX |
| TT | 04 |
| MM | 01 |
| RRR . . . | 9999 0002 0005 0008 0012 |
| DDD . . . | Adverse event data from hydrant monitor |
| XXXX | XXXX (cyclic redundancy check) |

The event data packet is sent to the Next Inbound Unit (i.e., 0008) which performs a retransmission act on the event data packet resulting in a retransmitted event data packet to the Next Inbound Unit (0005) in the form of:

| EVENT PACKET SEGMENT | SAMPLE PACKET DATA |
|---|---|
| SS | XX |
| CC | XX (even for event data packet) |
| UUUU | 0005 |
| CCCC | XXXX |
| TT | 04 |
| MM | 02 |
| RRR . . . | 9999 0002 0005 0008 0012 |
| DDD . . . | Adverse event data from hydrant monitor |
| XXXX | XXXX (cyclic redundancy check) |

Unit 0005, again not the destination unit, retransmits the event data packet as:

| EVENT PACKET SEGMENT | SAMPLE PACKET DATA |
|---|---|
| SS | XX |
| CC | XX (even for event data packet) |
| UUUU | 0002 |
| CCCC | XXXX |
| TT | 04 |
| MM | 03 |
| RRR . . . | 9999 0002 0005 0008 0012 |
| DDD . . . | Adverse event data from hydrant monitor |
| XXXX | XXXX (cyclic redundancy check) |

Unit 0002, again not the destination unit, retransmits the event data packet as:

| EVENT PACKET SEGMENT | SAMPLE PACKET DATA |
|---|---|
| SS | XX |
| CC | XX (even for event data packet) |
| UUUU | 9999 |
| CCCC | XXXX |
| TT | 04 |
| MM | 04 |
| RRR . . . | 9999 0002 0005 0008 0012 |
| DDD . . . | Adverse event data from hydrant monitor |
| XXXX | XXXX (cyclic redundancy check) |

Since the UUUU segment contains unique ID 9999, this packet will be received by unit 9999 (i.e. the host server 14 identified by ID 9999 in this example). The test for "end of path" is performed on the path segment RRR. This "end of path" test can be performed in a multitude of ways, some examples of which are described here.

For example, an "end of path" test can be the number of hops test described above. The number of hops segment TT is initialized at the host server 14 by analysis of the path segment RRR and determining the number of unique hops needed to complete the path segment RRR and the number of current hops segment MM is initialized to 01 to set the packet initially at a single current hop. Each "hop" along the segments of the path cause the current hops segment MM to be incremented. When the number of current hops MM equals the total number of hops TT, the trip is complete since the path was followed to its completion.

Another "end of path" test could be performed by simply including the unique ID of the final destination as a segment of the event data packet and the unique ID of the destination unit can be compared with the ID of the receiving unit. If they are the same, the packet is at the destination unit.

In the field of operation, the integrated communications module and controller of the communications unit 28 can be provided power in the field from a battery, such as a rechargeable battery, and a solar panel. Additionally, to reduce power consumption, the integrated communications module and controller of the communications unit 28 can be selectively powered up. For example, communications between the host server 14 and the communications units 28 may be allowed only at predetermined times during the day.

The invention provides systems and methods for gathering data from one or more remote locations and can be installed with a relatively minimum level of setup on a municipal monitoring server 16 and the equipment to detect and receive the adverse event data can be installed in the field with relatively minimum technical assistance. The servicing of the system takes place through connections to the Internet without any modification of the municipal monitoring server 16. The invention eliminates detailed programming of the messaging system at the municipal monitoring server 16 and different programs to match each protocol of multiple diverse municipal monitoring systems. In addition, the invention provides a package of hardware that can be installed in the field on hydrants, utility poles and water towers without any special expertise in vendor hopping systems.

The systems and methods disclosed herein enable remote data collection and provisioning for a municipal monitoring server 16 that may operate and communicate using formats and protocols particular to that municipal monitoring server 16. The host server 14 may receive a communication and request for data from the municipal monitoring server 16 in the specific format or protocol of the municipal monitoring server 16. The host server 14 may then communicate with remote communications units 28 using a hopping communication protocol from the communications units located at municipal infrastructure such as hydrants, utility poles and water towers that correspond with the request from the municipal monitoring server 16. Therefore, in effect, the host server 14 may communicate with the municipal monitoring server 16 in any suitable format selected by the operator of the municipal monitoring system 10 and may further execute the process of retrieving information and/or data from remote sites in yet another protocol.

Figures 3, 3A:
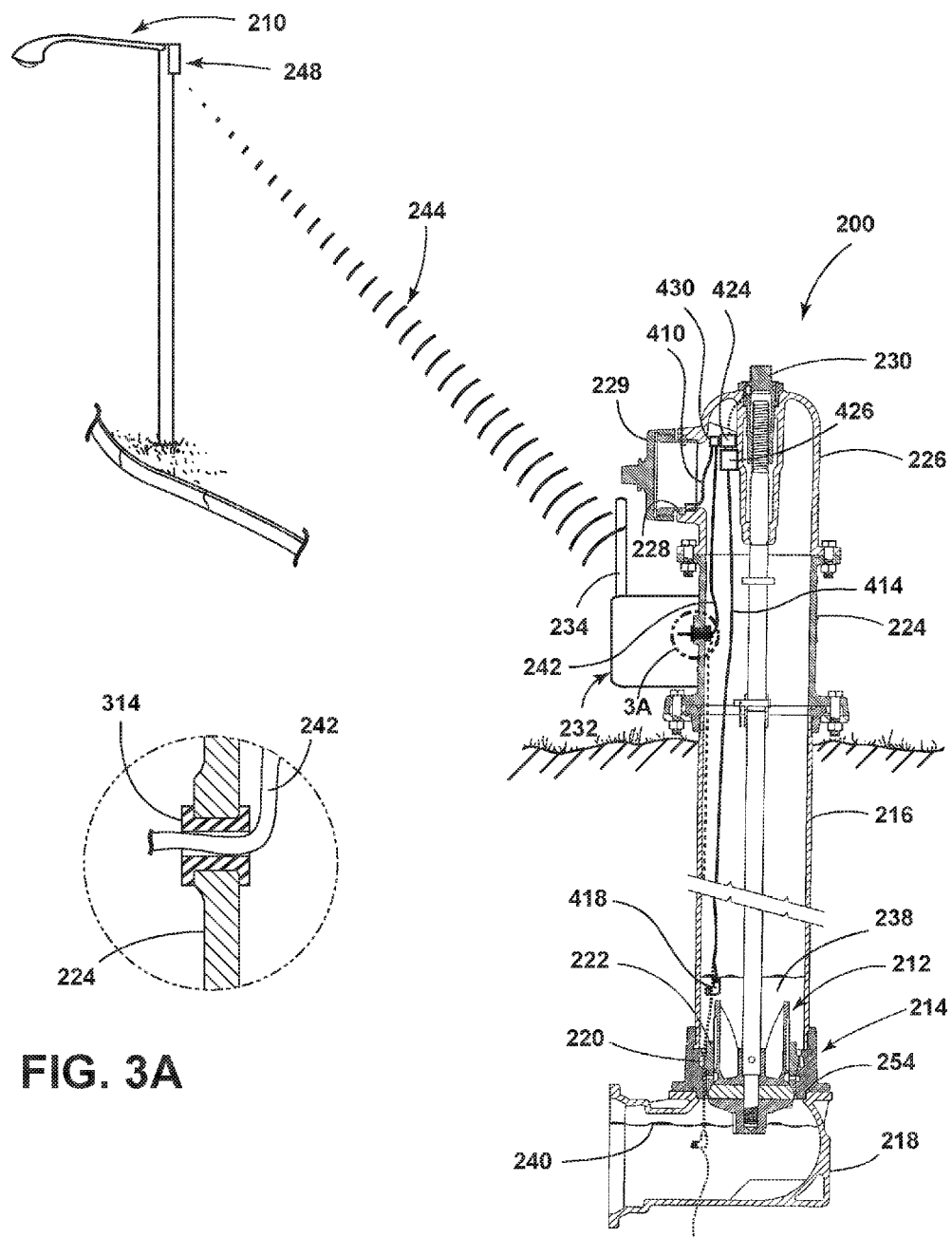
FIGS. 3 and 3A are a schematic view of a hydrant integrated with a hydrant monitor communicating data to a communications unit mounted to a utility pole in accordance with certain embodiments of the invention.

Referring now to FIG. 3, a communications device 248 (comprising the communications unit 28 and the transceiver 17 in FIG. 1) located on a utility pole 210 and hydrant monitor located on a hydrant 200 are shown according to an embodiment of the invention. The hydrant monitor (shown in FIG. 1 as 19) comprises detectors located on the hydrant 200 and is shown as transmitting data 244 to the communications device 248 located on the utility pole 210.

Fire hydrants are well-known and accordingly will only be described herein to the extent helpful in disclosing the present invention. For purposes of disclosure, the present invention is described in connection with a conventional WaterMaster® fire hydrant available from East Jordan Iron Works of East Jordan, Mich. The present invention is, however, readily incorporated into a wide variety of other fire hydrants as well as other municipal infrastructure, including but not limited to manhole covers and utility poles, and the present invention should not be interpreted as being limited to any particular municipal infrastructure. The hydrant 200 includes a hydrant shoe 218 which functions as an inlet, a valve seat flange 214 to receive the valve assembly 222, a lower standpipe 216, an upper standpipe 224 and a top bonnet 226 that supports, among other things, at least one nozzle 228 and the valve operating nut 230. A discharge nozzle cap 229 is threadably coupled to each nozzle 228. The hydrant 200 may include a valve 212 mounted within the valve seat flange 214. The valve seat flange 214 is disposed between the lower standpipe 216 and the hydrant shoe 218, and includes an integral liner 220 for threadably receiving the valve assembly 222. The integral liner 220 provides an integrated corrosion resistant liner for use in seating the valve assembly 222. The valve assembly 222 is threaded into the liner 220. A lower O-ring 254 is preferably fitted to facilitate a hermetic seal between the valve seat 214 and the hydrant shoe 218.

Figure 5:
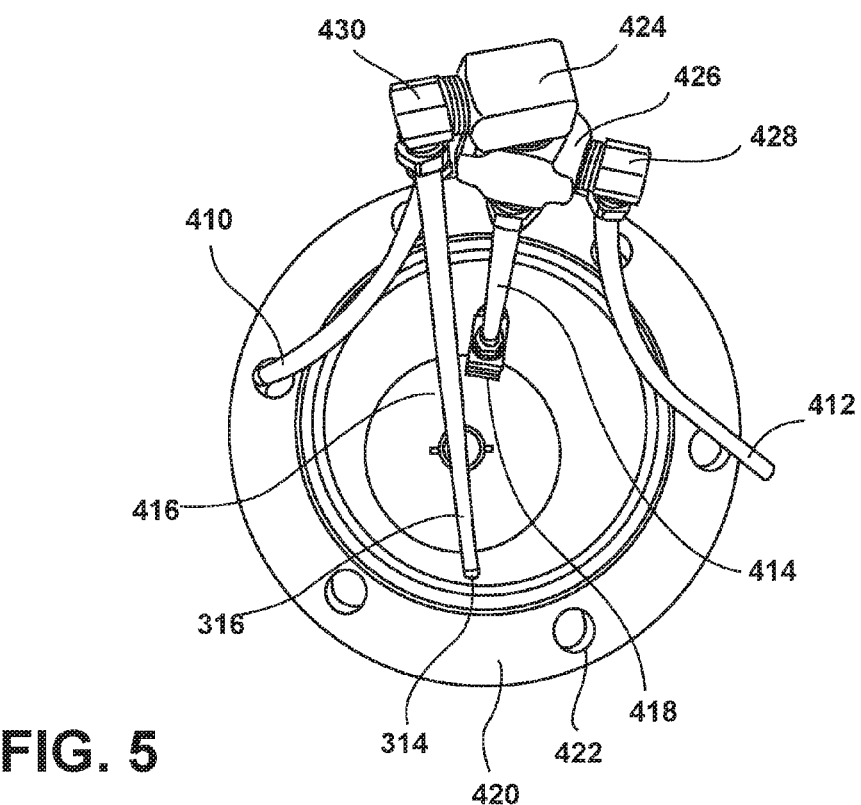
FIG. 5 is an overhead perspective view of a detector suite comprising two nozzle cap detectors and a fluid level detector placed in the standpipe of a hydrant in accordance with certain embodiments of the invention.

Previously described and shown in FIG. 1, each data collecting unit comprises a transceiver coupled to a communications unit 28 that is communicably linked to a hydrant monitor 19 further comprising a suite of detector 20a-20n. In an embodiment of the invention, shown in FIG. 3, the hydrant monitor further comprises a transceiver and antenna 234 connected to a control box 232 that contains the electronics necessary for communicating data via the antenna 234 to the communications device 248. The control box 232 additionally contains the electronics necessary for capturing and processing data collected by the detectors. The detectors, such as a nozzle cap detector 410 and a fluid level detector 418, are placed inside the fire hydrant 200 and are connected to the electronics in the control box 232 via an electrical connection 242. The detectors 410, 418 are interconnected by a series of threaded couplings 424, 426, 428, 430 (as shown in FIGS. 3 and 5) to provide an electrical connection 242 that connects the detectors to the control box 232. As best seen in FIG. 3A, the hardwired electrical connection 242 may communicate sensed data to the control box 232 from the detectors, 410, 418 contained in the interior of the hydrant 200 through a co-aligned bore 314 in both the upper standpipe 224 of the hydrant 200 and the control box 232.

The electrical connection 242 may preferably be a hardwired electrical connection consisting of one or more wires for each detector that are enclosed in a single flexible conduit 316 in FIG. 5, though a wireless connection may alternatively be implemented. The bore 314 in the hydrant may be pre-existing as a design element in the manufacture of the hydrant or may be drilled in situ to retrofit hydrants with a hydrant monitor and should be constructed as a leak free gasket encasing the electrical connection 242.

Figure 4:
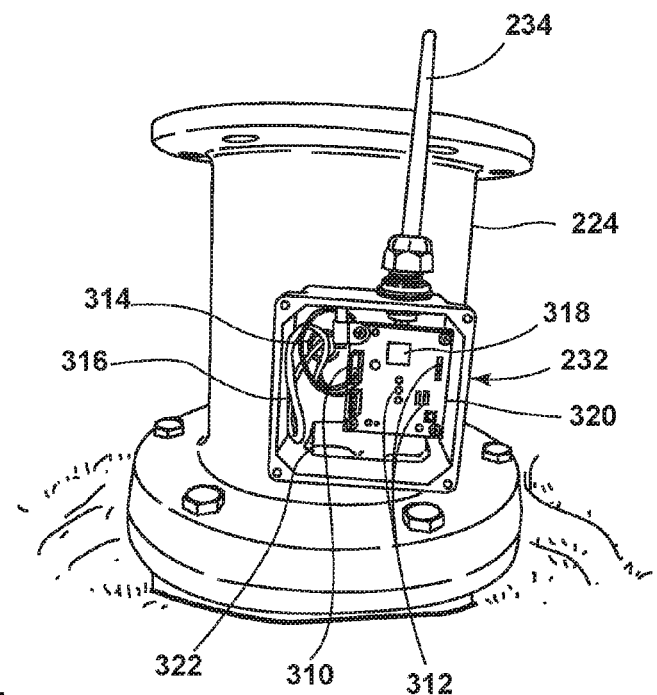
FIG. 4 is a front plan view of the control box of a hydrant monitor mounted to the upper standpipe of a hydrant in accordance with certain embodiments of the invention.

Referring now to FIG. 4, the control box 232 may contain a printed circuit board 320 with a processor 318 connected via the circuit board 320 to electronic components 312 mounted on the circuit board 320 for collecting, processing and transmitting sensed data. The control box 232 may be externally mounted to the upper standpipe 224. The hardwired electrical connections contained in the flexible conduit 316 are then connected to the circuit board 320 by conventional means well known in the art of circuit board assembly such as by multi-pin wire-to-board connectors 310. Additional elements contained in the control box 232 and connected to the processor 318 by way of electronic elements 312 on the circuit board 320 may include a battery 322 to provide power to the components of the hydrant monitor. In one embodiment of the hydrant monitor, a magnetically activated detector may be attached to the hydrant monitor to activate the unit from a sleep mode to an active mode to enable additional programming, initiate a water flow test or sense a condition indicative of undesirable tampering of the control box 232.

Referring now to FIG. 5, the hardwired electrical connections contained in the flexible conduit 316 may be traced through the bore 314 to the detector suite located inside the hydrant. The detector suite consists of a number of detectors placed inside the standpipe and/or bonnet of the hydrant and collect data indicative of the status or condition of operable characteristics of the hydrant. As shown in FIG. 5, one preferred detector suite consists of two nozzle cap detectors 410 and 412 and a fluid level detector 418 placed in the lower standpipe 216 and connected to the other detector elements by a hardwired connection such as a two wire length contained in a conduit 414.

Nozzle cap detectors 410 and 412 output a signal to detect the removal of a nozzle cap (one of which is shown as 228 in FIG. 3). Magnets placed in each nozzle cap activate the detector. Removal of a nozzle cap separates the magnet from the detector tip and a corresponding signal is output to the processor 318 in the control box 232. The processor 318 may then transmit the data to the municipal monitoring server via the communication network previously described by "component hopping" through a predefined path of communications units to the host server and then to the municipal monitoring server by way of the Internet.

Figure 6:
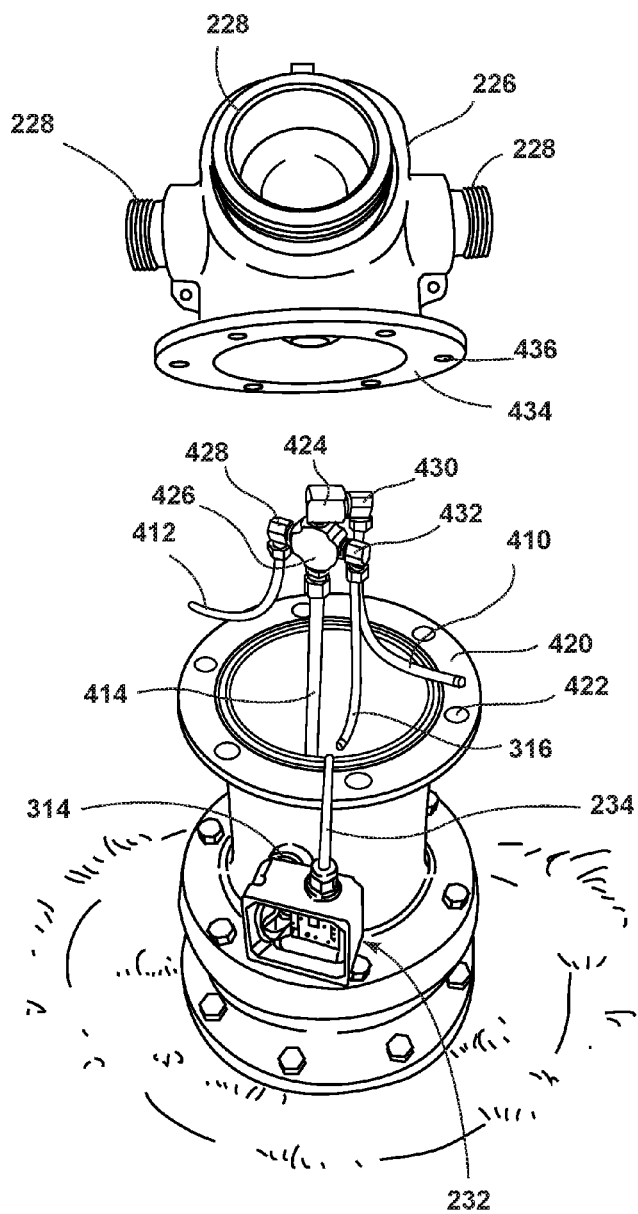
FIG. 6 is a perspective view of a detector suite comprising two nozzle cap detectors and a fluid level detector placed in the standpipe of a hydrant in accordance with certain embodiments of the invention.

In one embodiment of the invention, the nozzle cap detectors 410 and 412 are made of flexible poll pipe with magnetically activated detectors in the tips. Flexible pipe enables the detector suite and the hydrant to be more easily serviced and allows the detector suite to be integrated into most types and configurations of hydrants. As best seen in FIG. 6, the flexible connections for the nozzle cap detectors 410 and 412 enable the bonnet 226 to be easily removed or attached to the upper standpipe. The bonnet 226 is connected by bolts (not shown) to the standpipe by aligning the plurality of bolt holes 436 on the bonnet flange 437 to the plurality of bolt holes 422 on the standpipe flange 420. When attaching the bonnet 226 to the standpipe, the nozzle cap detectors 410, 412 are fed into the nozzles 228.

Another element of the detector suite is a fluid level detector 418 that extends into the lower standpipe. The fluid level detector 418 outputs a signal to detect either the presence or absence of water at a predetermined vertical position in the lower standpipe. For example, the fluid level detector 418 may be positioned to detect the presence of water in the lower standpipe above the valve (shown in FIG. 3 with the water level 238 above valve 212). In another example, the fluid level detector may be positioned to detect the presence or absence of water in the hydrant shoe (shown in FIG. 3 with the water level 240 in the hydrant shoe 218 and the dotted line indicator for the fluid level detector 418). As indicated by dotted line 418 in FIG. 3, the fluid level detector 418 may be placed at any depth appropriate sensing the level of fluid such as water indicative of an operable condition of the hydrant. The processor 318 may transmit data indicative of an event related to the water level to the municipal monitoring server via the communication network previously described by "component hopping" through a predefined path of communications units to the host server and then to the municipal monitoring server by way of the Internet.

Figure 7:
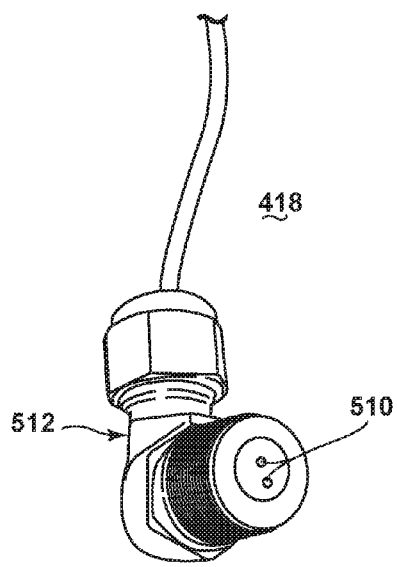
FIG. 7 is a perspective view of a fluid level detector in accordance with certain embodiments of the invention.
Figures 8, 8A:
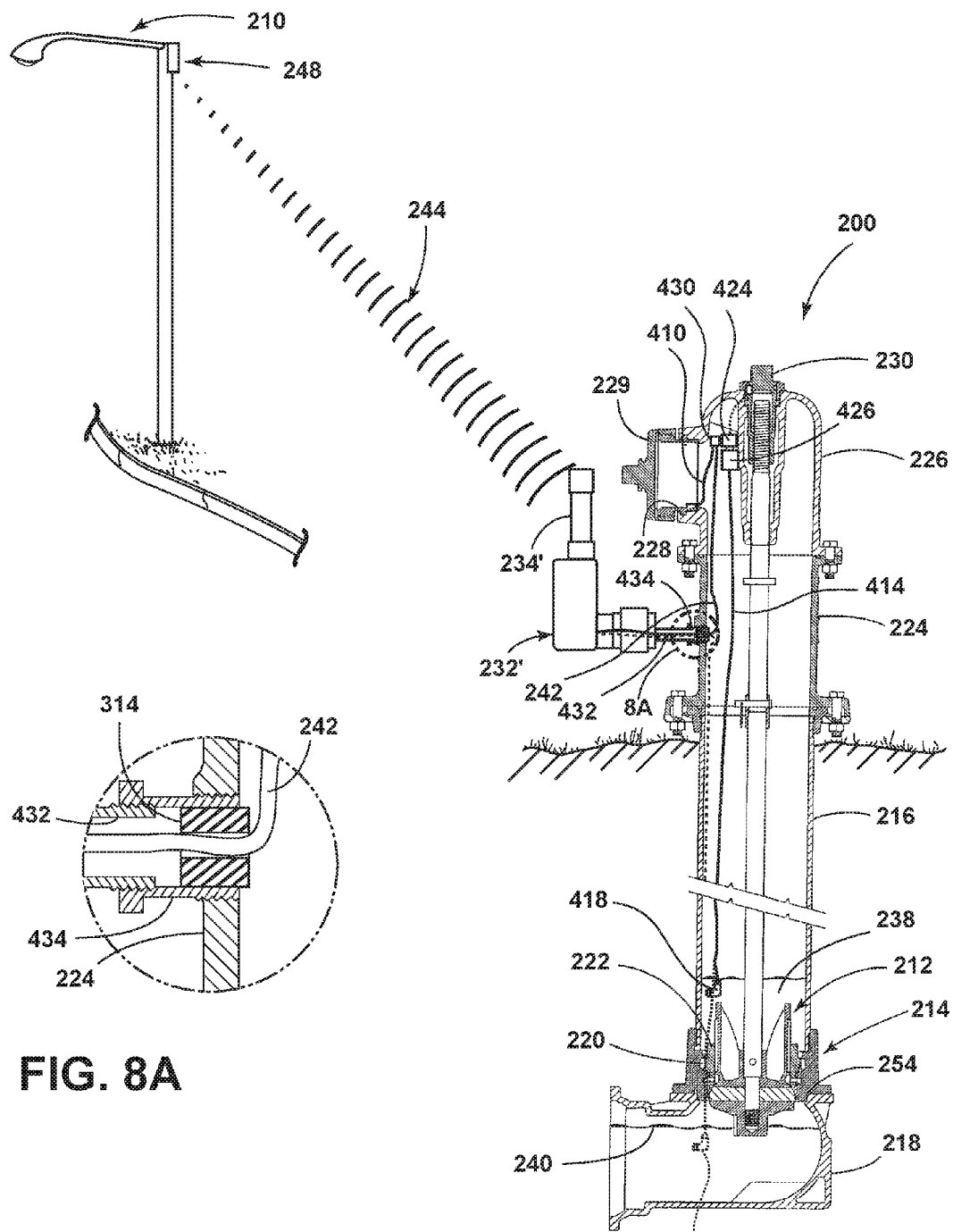
FIGS. 8 and 8A are a schematic view of a hydrant integrated with a hydrant monitoring system according to another embodiment of the invention.

Referring now to FIG. 7, in one embodiment, the fluid level detector 418 is two lengths of wire 510 potted into a 90-degree fitting 512. The potted fitting 512 prevents water from traveling up the connection 414 into the control box. The 90-degree fitting 512 enables water to roll off the tip of the detector when the water level recedes. The presence of water effectively short circuits the ends of the two lengths of wire 510. The absence of water effectively opens the circuit at the ends of the two length of wire 510. The spacing between the two lengths of wire 510 may be selected for optimal operation of the detection circuit. The fitting is shown as a 90-degree fitting, but other configurations of the wires and fitting may be used depending upon the implementation. Further, other fluid level technologies may be used alone or in combination and may include, but not be limited to: float sensors, hydrostatic devices, load cells, magnetic level gauges, capacitance transmitters, magneto restrictive level transmitters, ultrasonic level transmitters, laser level transmitters, radar level transmitters, etc.

The detector suite outlined above may be modified to add additional sensing modalities to the hydrant monitor. Other detectors may be implemented to provide data relating to temperature, humidity, fluid pressure or any one of a number of phenomena useful for municipal infrastructure monitoring. The above-described monitoring system may be used for municipal infrastructure other than hydrants. For example, the hydrant monitors or the communications units may be integrated into manhole covers, utility poles, water meters, street lights or traffic lights.

FIGS. 8-11 illustrates a preferred embodiment of a hydrant integrated with a hydrant monitoring system in accordance with certain embodiments of the invention. The hydrant monitoring system of FIGS. 1-7 is functionally the same as the hydrant monitoring system of FIGS. 8-11 but the hydrant monitoring system of FIGS. 8-11 have been recast into a smaller and more efficient package. In FIGS. 8-11 parts that are functional equivalent to those parts in FIGS. 1-7 are identified with like numerals appended with a prime symbol, with it being understood that the functional description of the parts of FIGS. 1-7 above applies to the parts of FIGS. 8-11, unless otherwise noted. As shown, the detectors, such as a nozzle cap detector 410 and a fluid level detector 418, are placed inside the fire hydrant 200 and are connected to the electronics in control box 232' that extends laterally from the hydrant via an electrical connection 242. The hydrant monitor further comprises a transceiver and antenna 234' connected to the control box 232' that contains the electronics necessary for communicating data via the antenna 234' to the communications device 248. The control box 232' can be an electrical conduit El that has an opening 232a that may be closed by a removable cover, cover 232b. The cover 232b is attached to the control box through tamper-proof machine screws.

Figure 9:
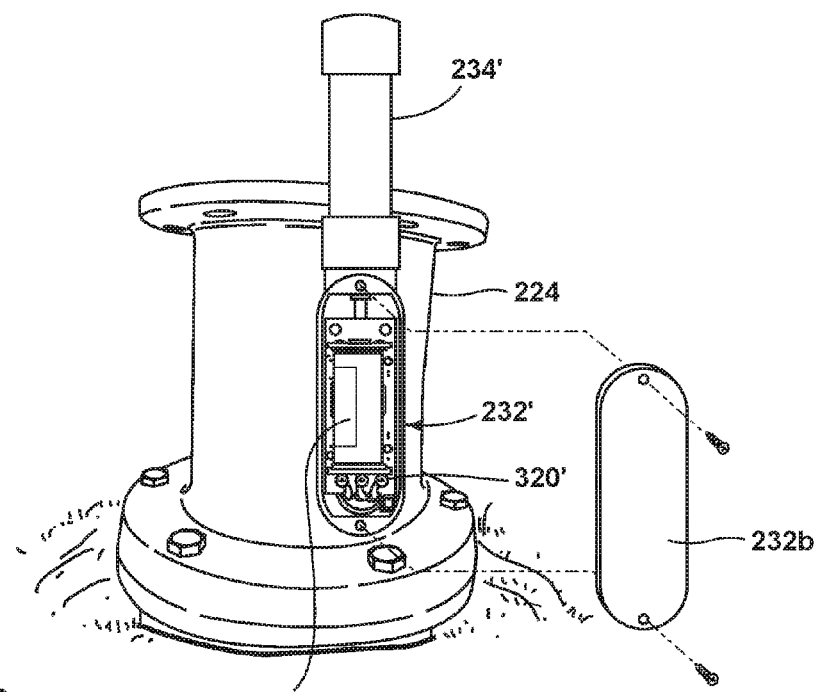
FIG. 9 is a front plan view of the hydrant monitoring system shown in FIGS. 8 and 8A with a cover of a control box removed.

As illustrated in FIG. 9, the control box 232' is mounted to the upper standpipe 224 of a hydrant 200 through a conduit 432 and a pipe fitting 434. The pipe fitting may be threaded into the bore 314' in the upper standpipe 224. The control box 232' may contain a printed circuit board 320' with electronic components including a processor connected via the circuit board 320' to electronic components mounted on the circuit board 320' for collecting, processing and transmitting sensed data. Additional elements contained in the control box 232' may include a battery 322' to provide power to the components of the hydrant monitor.

Figure 10:
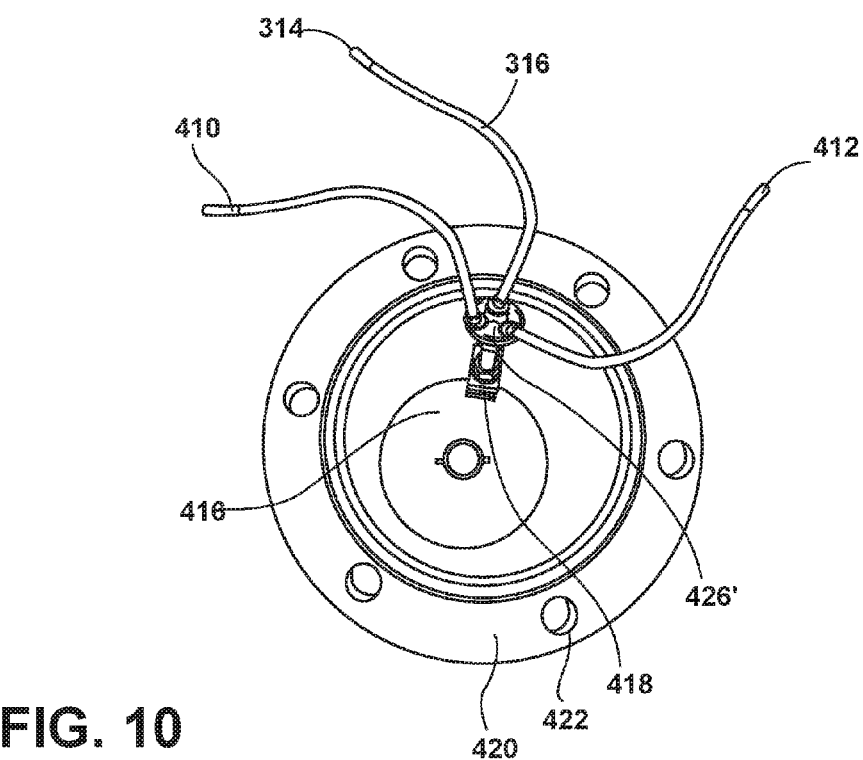
FIG. 10 is an overhead perspective view of a the hydrant monitoring system of FIGS. 8, 8A and 9 with the bonnet of the hydrant removed and illustrating a detector suite.

As illustrated in FIG. 10. a detector suite comprises three nozzle cap detectors 314, 410, 412 and a fluid level 418 that are mounted to a coupling 426'.

Figure 11:
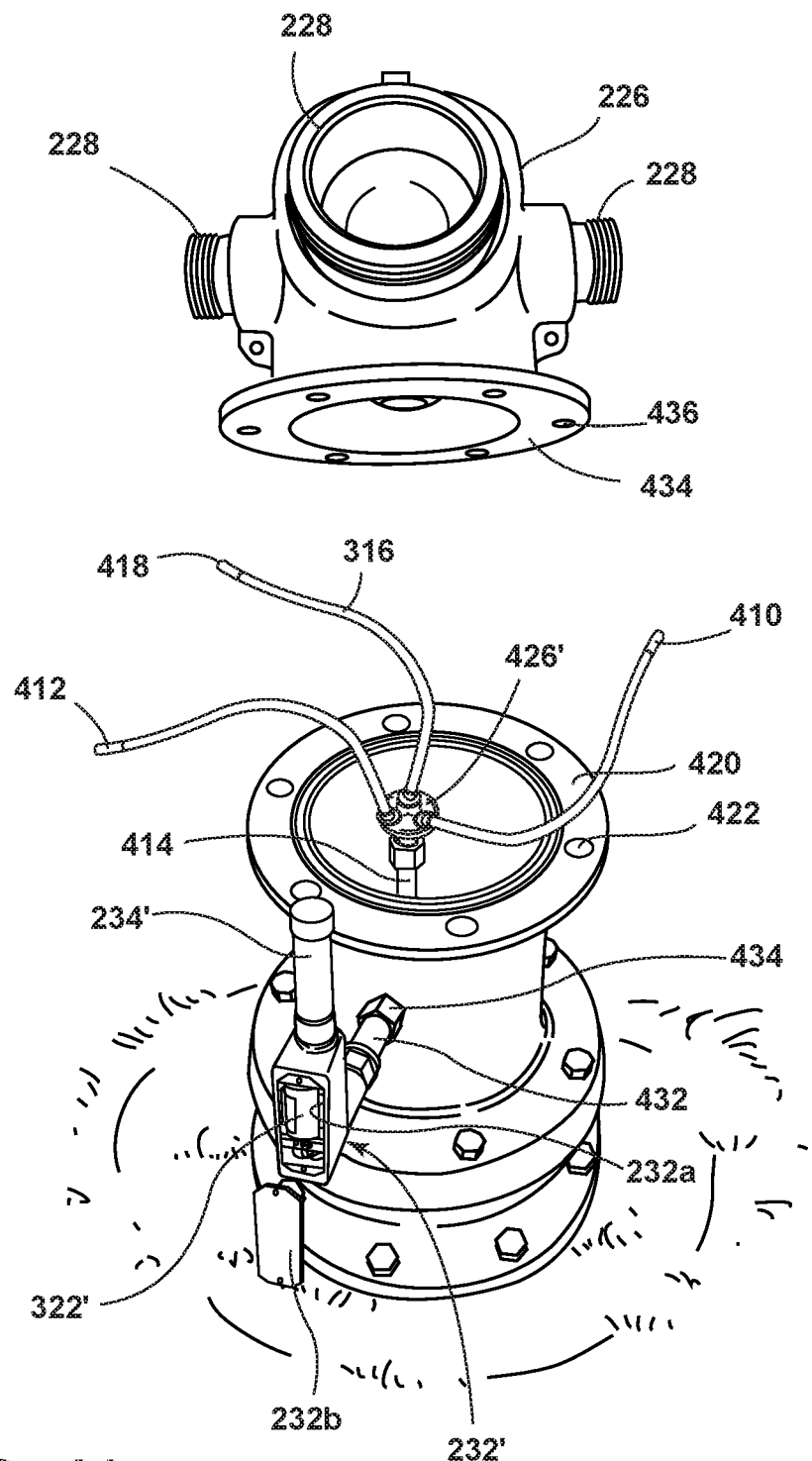
FIG. 11 is an exploded perspective view of the hydrant monitoring system of FIGS. 8-10 with the hydrant bonnet removed and a detector suite.

As illustrated in FIG. 11, the detector suite comprises three nozzle cap detectors and a fluid level detector placed in the standpipe of a hydrant in accordance with certain embodiments of the invention.

Figure 12:
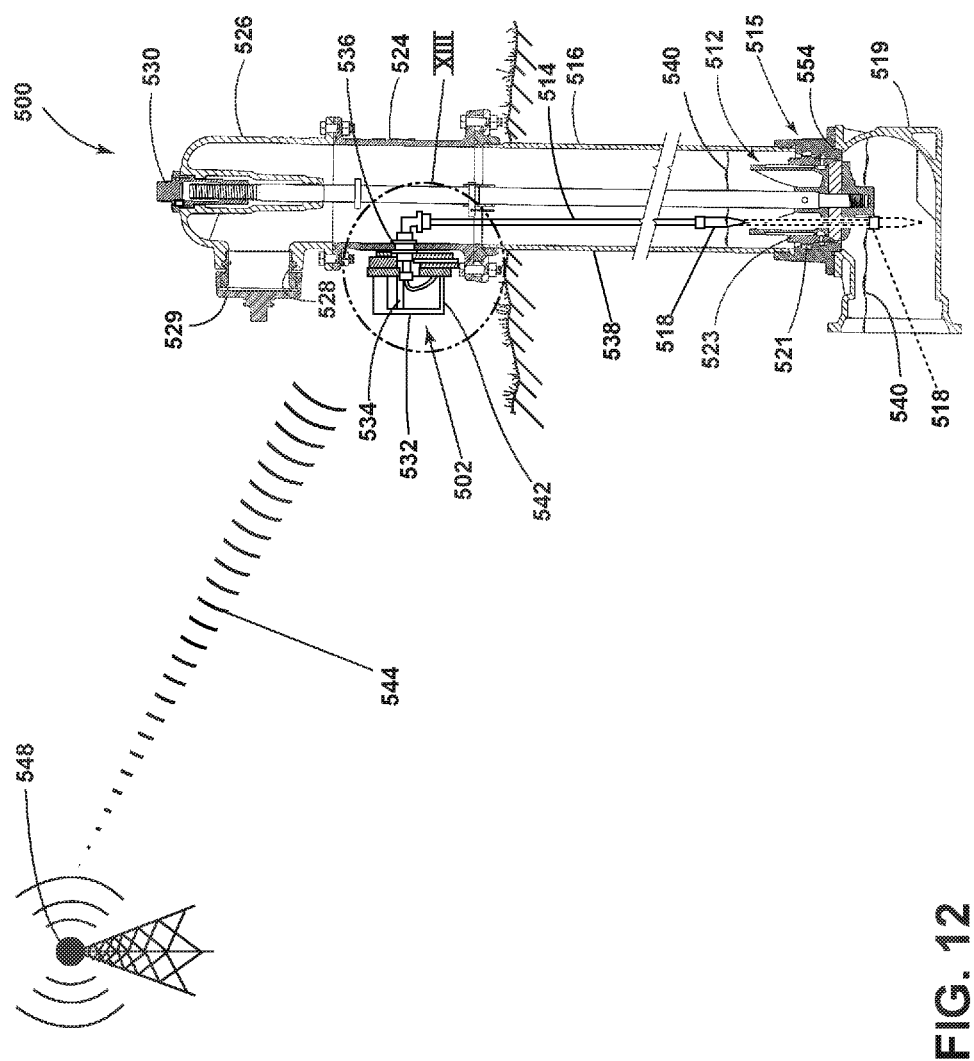
FIG. 12 is a schematic view of a hydrant integrated with a device integrated with a hydrant monitor system according to another embodiment of the invention.

Turning to FIG. 12 a preferred embodiment of a device 502, illustrated as a control box 532 mounted to a fire hydrant 500 and in communication with a wireless tower 548, can be integral with the hydrant monitoring system in accordance with certain embodiments of the invention described herein. It should be understood that the description of the hydrant monitoring system of FIG. 3 applies to the hydrant monitoring system of FIG. 12 unless otherwise noted.

The fire hydrant 500 includes a hydrant shoe 518 which functions as an inlet, a valve seat flange 515 to receive a valve assembly 523, a lower standpipe 516, an upper standpipe 524 and a top bonnet 526 that supports, among other things, at least one nozzle 528 and the valve operating nut 530. A discharge nozzle cap 529 is threadably coupled to each nozzle 528. The fire hydrant 500 may include a valve 512 mounted within the valve seat flange 515. The valve seat flange 515 is disposed between the lower standpipe 516 and a hydrant shoe 519, and includes an integral liner 521 for threadably receiving the valve assembly 523. The integral liner 521 provides an integrated corrosion resistant liner for use in seating the valve assembly 523. The valve assembly 523 is threaded into the liner 521. A lower O-ring 555 is preferably fitted to facilitate a hermetic seal between the valve seat 515 and the hydrant shoe 519. The standpipe 524 defines a dry barrel fire hydrant 500.

A communications device, for example but not limited to the wireless tower 548, is in communication with the control box 532 mounted to the fire hydrant 500. The hydrant monitoring system of FIG. 12 comprises detectors, including a water sensor 518 in communication with the control box 532 and shown as transmitting data 544 to the wireless tower 548. The water sensor 518 is received through an aperture 536 journaled through an exterior 538 of the fire hydrant 500. The water sensor 518 is in electronic communication with a wireless antenna 534 within the control box 532. Data 544 regarding the status of a water level 540 is transmitted from the wireless antenna 534 to the wireless tower 548.

Figure 13:
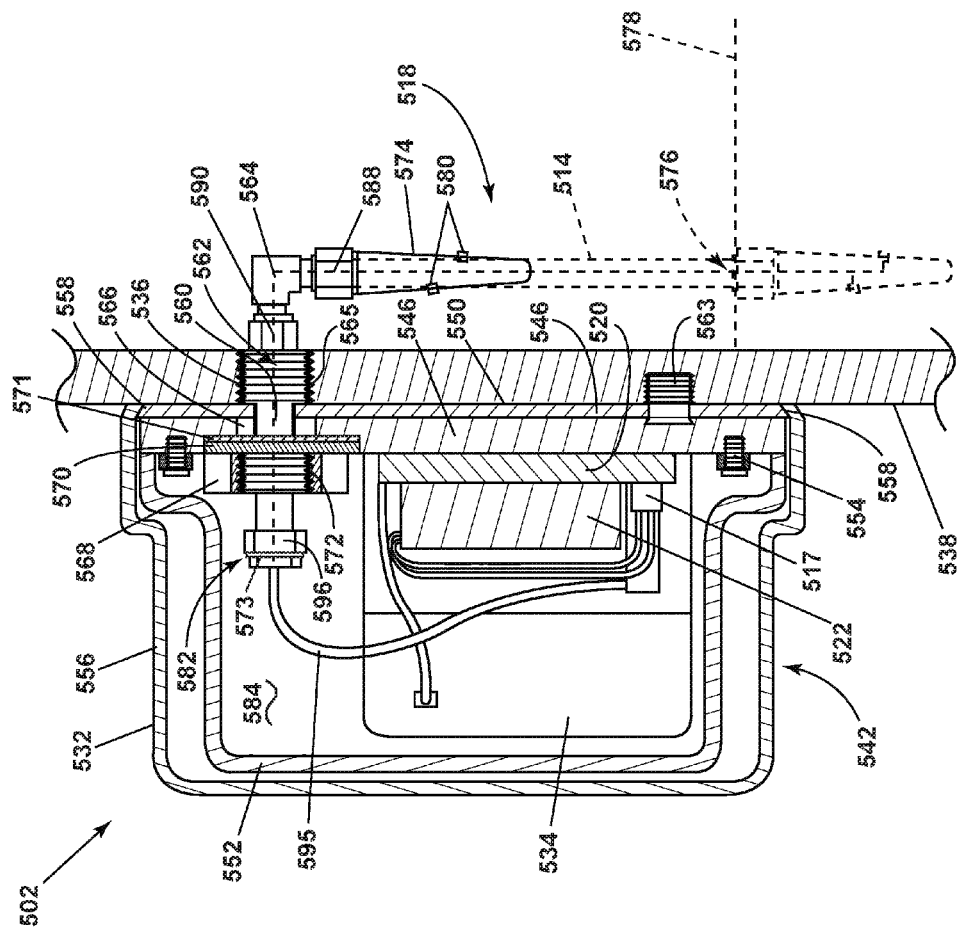
FIG. 13 is an enlarged schematic cross-section of the device from FIG. 12.

Turning to FIG. 13, an enlarged view of the control box 532 from call-out VIII in FIG. 12 is illustrated to more clearly show the control box 532 and the water sensor 518. The control box 532 comprises a housing 542 in which a controller 513 is located. The controller 513 can include, but is not limited to a wireless antenna 534, a battery pack 522, circuit board 520, and a transceiver 517.

The housing 542 is configured to mount to an exterior 538 of the fire hydrant 500 at a housing base 546. The housing base 546 is mounted to a primary seal 550 in register with the exterior 538 of the fire hydrant 500. The primary seal 550 includes a hole 560 in line with the aperture 536 of the fire hydrant 500. A housing cap 552 is coupled to the housing base 546 with fasteners 554, by way of non-limiting example tamper proof bolt screws.

A housing cover 556 fastens to the base 546 at a bevel 558 circumscribing the primary seal 550. The housing cover 556 can be molded from a copolymer material, for example but not limited to an ultraviolet resistant acetal copolymer. The housing cover 556 can be manufactured to have a range of colors, by way of non-limiting example the housing cover 556 can be blue, green, orange, or red corresponding to a standard color code each of which designate a flow capacity of the fire hydrant 500. Blue indicating a flow capacity of 1500 GPM or more, or a very good flow, green indicating 1000-1499 GPM, good for residential areas, orange indicating 500-999 GPM, marginally adequate flow, and red indicating a below 500 GPM which is an inadequate flow. It is further contemplated that the color coding can be designated by the municipality in which the fire hydrant 500 is located and can therefore be any color.

It is further contemplated that the housing cover 556 can further include a paint mask. In this manner, the additional separate paint mask (not shown) can be installed to assist when repainting the fire hydrant 500 for maintenance updates. The paint mask can therefore protect the color coding while the remaining portions of the fire hydrant 500 are painted during routine maintenance.

A coupling fixture 562 passes through the aperture 536 and hole 560 and terminates in an elbow joint 564. The coupling fixture can include a first bulkhead fitting 565 received within the aperture 536 coupled to a permanent nut feature 566 abutting the housing base 546 of the control box 532. The coupling fixture 562 passes through the housing base 546 and can further include an attachment nut 568, washer 570, and a secondary seal 571. A compression nut and ferrule 593 is mounted to the coupling fixture 562 within the control box 532 and also includes a compression insert 573.

When secured, the attachment nut 568, washer 570, and secondary seal 571 compress the housing base 546 and primary seal 550 toward the exterior 538 of the fire hydrant 500 via a second bulkhead fitting 572 on the coupling fixture 562. A secondary coupling fixture 563 can further secure the housing 542 to the exterior 538 of the fire hydrant 500. The secondary coupling fixture 563 can comprise a hex coupling threaded into the fire hydrant 500. The hex coupling can have a rounded exterior and hexagon shaped socket in which a hex stud from the housing base is received. The secondary coupling fixture 562 can provide additional stability and be tamper proof.

The water sensor 518 includes a probe 574 mounted to a first end 576 of a bendable conduit 514 and can be located at an adjustable depth 578 illustrated in phantom. The bendable conduit 514 extends from the probe 574, passes through the elbow joint 514 and coupling fixture 562, and terminates in a second end 582 within the coupling fixture 562. A fastener 588 secures the probe 574 to the bendable conduit 514. An additional fastener 590 couples the elbow joint 564 to the coupling fixture 562. The fasteners 588, 590 can be by way of non-limiting example, nut and bolt fasteners. The bendable conduit 514 includes a spring rod 586 within configured to keep the bendable conduit 514 straight and in place when the probe 574 has reached a desired depth suited for the fire hydrant 500.

Figure 14:
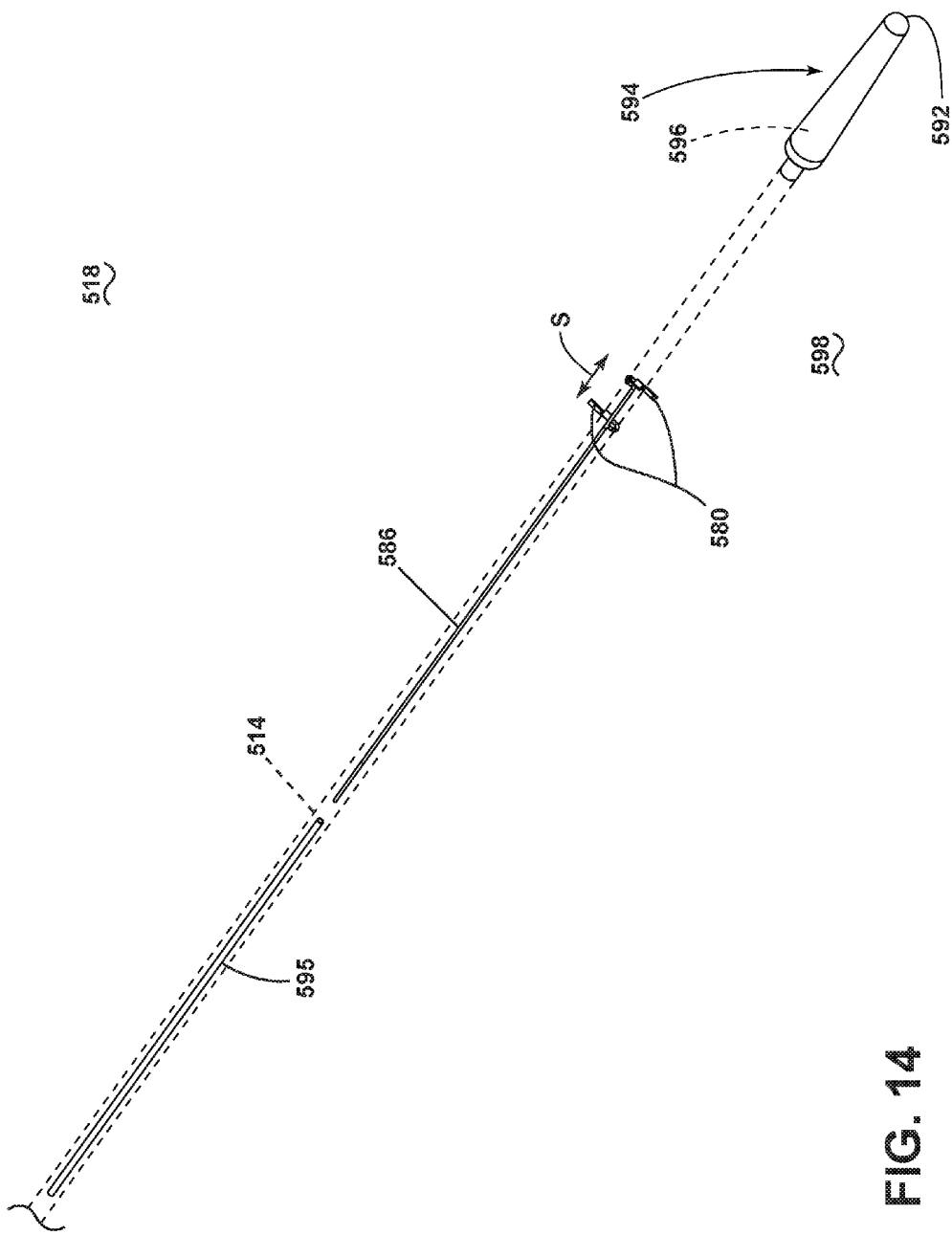
FIG. 14 is an exploded view of a water sensor for the device from FIG. 13.

As can be more clearly seen in FIG. 14, the water sensor 518 can include the bendable conduit 514, the spring rod 586 and the probe 574. The probe 574 can have, but is not limited to, a substantially conical shape 592. The conical shape 592 can be, by way of non-limiting example, substantially frusto-conical terminating in a blunt apex 594. The probe 574 can be made of a copolymer material. The shape and material of the probe 574 give the probe 574 hydrodynamic properties minimizing resistance when water is flowing through the hydrant 500, so that the water sensor 518 is able to hold a position within the fire hydrant 500 even under high pressure water flow. The conical shape 592 also enables ease of placement of the water sensor 518 through the aperture 536.

The probe 574 can be co-molded with a pair of electrically isolated terminals 580 such that an interior 596 of the probe 574 is fluidly isolated from an exterior 598 of the probe 574. The electrically isolated terminals 580 vertically spaced (S) and located on opposite sides with respect to the probe 574.

Hardwired electrical connections contained within the bendable conduit 514 extending from the electrically isolated terminals 580 to the circuit board 520 and in electrical communication with the circuit board 520 by a wire 595. The electrically isolated terminals 580 become electrically interconnected and register a water presence when both electrically isolated terminals 580 are simultaneously in contact with water. The spacing (S) of the electrically isolated terminals 580 along with the conical shape 594 of the probe 574 can minimize false readings of water presence. The spacing (S) ensures readings when both electrically isolated terminals 580 are in contact with the water while the conical shape 594 sheds surface water. The shape, therefore, helps to prevent continued connectivity between the electrically isolated terminals 580 after the water level has dissipated. The probe 574 registers the presence of water and communicates the data 544 to the transceiver 517 in the control box 532 via the wire 595. The data 544 is then wirelessly communicated to the wireless tower 548 via the wireless antenna 534.

Figure 15B:
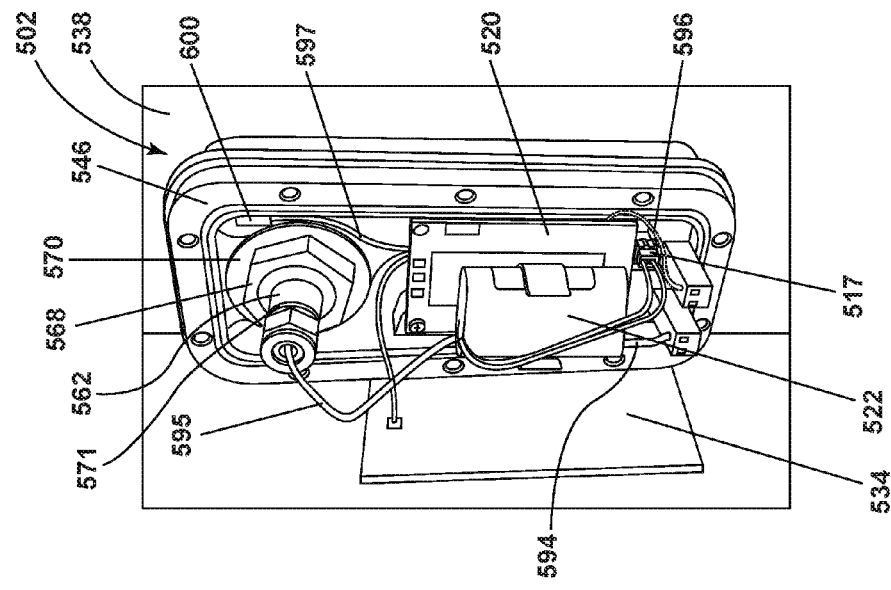
FIG. 15B is a perspective view of the device from FIG. 14A with another portion of the device partially assembled.
Figure 15A:
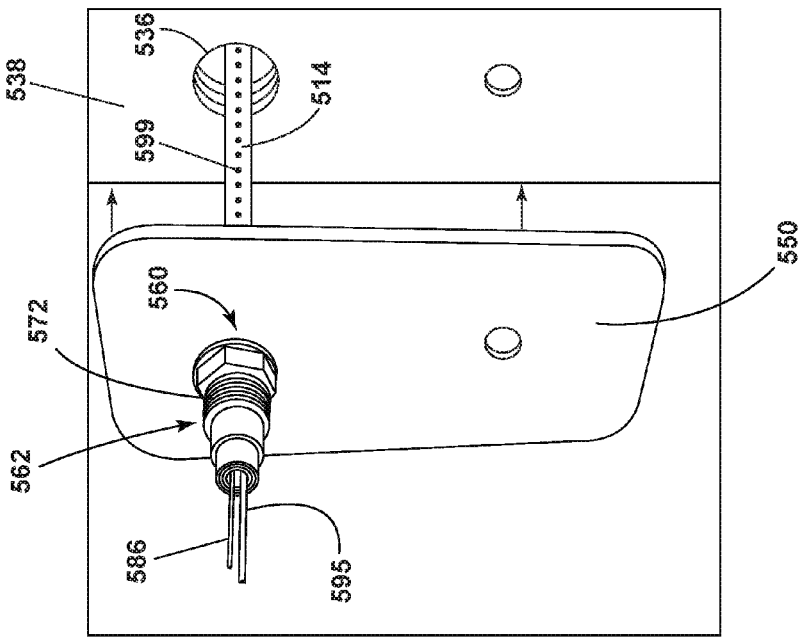
FIG. 15A is a perspective view of a portion of the device from FIG. 13 in partially assembled.

Turning to FIG. 15A the primary seal 550 is first mounted to be in register with the exterior 538 of the fire hydrant 500 with the coupling fixture 562. The second bulkhead fitting 572 of the coupling fixture 562 extends horizontally through the hole 560. The primary seal includes a secondary hole 561 through which the secondary coupling fixture 563 can be received. It is also contemplated that the primary seal 550 can be adhesively bonded to the exterior of the fire hydrant 500 before the control box 532 is mounted. The adhesive can be, for example but not limited to, a rubber to metal adhesive bond. The housing 542 can be mounted to be in register with the exterior 538 of the fire hydrant 500 mechanically, adhesively, or a combination of both mechanically and adhesively. It should be understood that the bonds described herein are not meant to be limiting.

The water sensor 518 is received through the aperture 536 and extends into the fire hydrant 500. The bendable conduit 514 (shown substantially straight for clarity) can include markings 599, which can be by way of non-limiting example indicia, indicating the location of the electrically isolated terminals 580 with respect to the probe 574. The markings 599 provide site for the blind entry of the probe 574 within the fire hydrant 500. In this manner, proper placement of the electrically isolated terminals 580 with respect to the sidewalls of the fire hydrant is ensured.

In FIG. 15B, the attachment nut 568 and washer 570 are used to secure the housing base 546 to the primary seal 550 via the second bulkhead fitting 572. The transceiver 517 can be mounted to the circuit board 520 along with the battery pack 522. The wire 595 from the bendable conduit 514 is electrically coupled to the circuit board 520 to communicate information regarding any water level 540 in the dry barrel fire hydrant 500. The wire 595 can be for example, but not limited to, a shielded Teflon 2 wire. The antenna 534 is electrically coupled to the transceiver 517 via the circuit board 520 to communicate the information received via data 544 to the wireless tower 548. An open read switch 600 can be provided within the housing base 546 proximate the coupling fixture 562. The open read switch is electrically coupled to the circuit board 520 via wire 597.

The housing cap 552 is mounted to the housing base 546 as shown in FIG. 15C via fasteners 554. Finally the housing cover 556 is placed over the housing cap 552 as can be seen in FIG. 15D. The housing cover 556 can snap to the housing base 546. The housing cover 556 completely envelops the housing cap 552 to prevent unwanted tampering to the fasteners 554 or access to the interior 584 of the housing 542. The housing cover 556 can include a magnet 602 embedded within the copolymer material. The magnet can be by way of non-limiting example, a neodymium magnet. The magnet 602 and the open read switch 600 form a magnetic dipole. When the magnetic dipole is broken, in the case of removal of the housing cover 556, the open read switch 600 sends data 544 via the antenna 534 that the housing cover 556 has been moved, tampered with, or completely removed.

Figure 16:
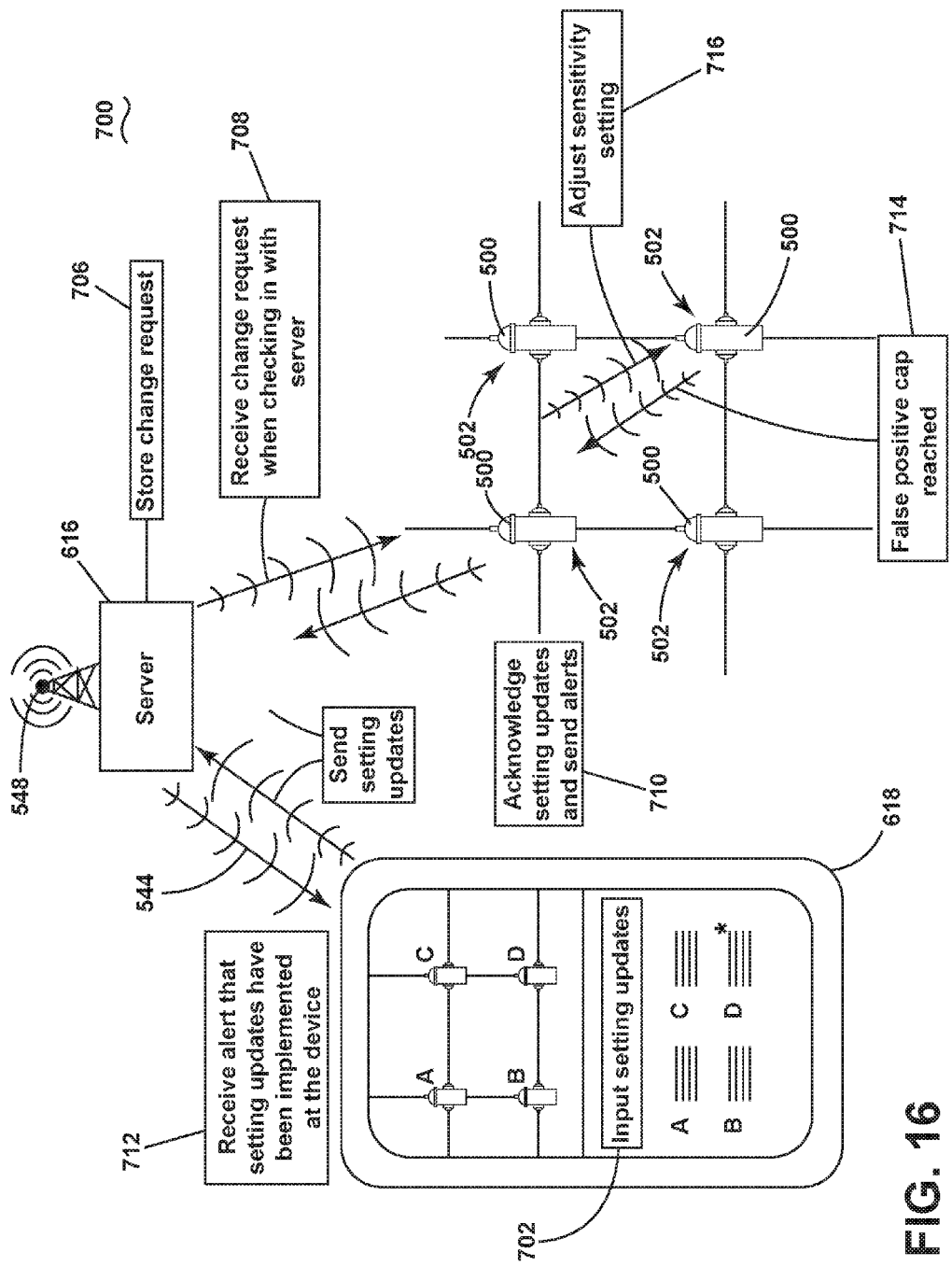
FIG. 16 is a diagram illustrating a method in which the device of FIG. 13 is used.

Turning to FIG. 16, data 544 can be sent to any appropriate remote location via a server 616 and wireless tower 548. A remote location can include but is not limited to a mobile device 618. Mobile devices can include hand held smartphones or a tablet computer capable of running a computer application. In a method of communicating updates 700, a user can input setting updates 702 into the mobile device 618 which are sent to the server 616 at 704. The server 616 can store the requested change 706 until the device 502 checks in with the server 616. The device 502 would receive the requested changes at 708, this request can include, but is not limited to details of what settings should be changed and how to change them on the device 502. Upon updated the appropriate settings, the device 502 sends an acknowledgement of the setting updates at 710. An alert is received at 712 at the mobile device 618 that the requested updates have been processed.

It is further contemplated that the device 502 is capable of automated updates illustrated as an (*) on the mobile device 618. An exemplary update is depicted at 714 when vibrations of trucks passing regularly trigger an accelerometer within the device 502. When a false positive cap has been reached at 714, a request for an automatic update is sent to the server 616. The server 616 then automatically reduces the sensitivity setting at 716 on the hydrant 500 without any manual user input.

Benefits associated with the device of the control box mounted to the exterior of the fire hydrant as described herein include eliminating unnecessary tampering or dismantling of the bonnet. A fire hydrant monitoring system can be retro-fit to an existing fire hydrant without unnecessary access to the interior of the fire hydrant through the bonnet. A bendable conduit coupled to the fluid level detector enables installation of the fluid level detector through the aperture at the exterior of the fire hydrant. The adjustable length of the bendable conduit provides versatility and range in terms of fire hydrants to which the fire hydrant monitoring system can be installed. For example, the fire hydrant monitoring system as described herein can be mounted to a fire hydrant with a significantly high water level so that little to no conduit extends into the fire hydrant. Alternatively the conduit can extend to various depths within the dry barrel as required, including below the frost line in northern regions.

The housing and cover provide additional benefits to the fire hydrant monitoring system as described herein. The housing mounts to an exterior of the fire hydrant rather than to an interior, enabling a retro-fit system to an existing fire hydrant. The cover snaps to the housing providing a tamper proof protection to the fire hydrant monitoring system. The cover can be produced in various colors alerting users to the flow capacity of the fire hydrant.

Additionally utilizing a mobile application for monitoring and updating the device provides for ease of maintenance. Automated updates prevent unnecessary maintenance checks. Alerts to the mobile device as described herein also provide streamlined maintenance.

While described in the context of detecting and transmitting adverse event information, the method and system described above is equally applicable to transmitting data representative of a determination that no adverse data event has occurred in the remote hydrants. For example, the system may be additionally configured to generate a daily report from each remote hydrant that indicates that each hydrant and hydrant monitor is operating correctly. That is, no adverse event in the hydrant has been detected by the hydrant monitor and the hydrant monitor is operating within acceptable parameters. Reporting the state or condition of the components in the hydrant or hydrant monitor in this manner may occur according to a user-defined schedule, whereby predetermined times are selected for determining that no adverse event has occurred in the remote hydrants. Alternatively, the municipal monitoring server may default to a condition of no adverse event unless an adverse event data packet is transmitted from the host server.

Data representative of the determination of a non-adverse condition may be transferred from the hydrant to the host server and then from the host server to the municipal monitoring server. In this way, the system may regularly update and actively inform an operator (e.g. with a visual representation that quickly shows the status of each monitored hydrant) of the status of the entire system and its constituent components. The predetermined time of the reporting of the status or non-adverse conditions of a remote hydrant may vary depending upon the implementation. However, it is contemplated that a desirable user-defined schedule may include a 24 hour duration of time. That is, daily reports may be optimal for an operator of the system to receive data that describes the condition or status of the hydrant and hydrant monitor components, including but not limited to a battery level and the condition of the hydrant monitor sensors.

Reasonable variation and modification are possible within the forgoing description and drawings without departing from the spirit of the invention. While the invention has been specifically described in connection with certain specific embodiments thereof, it is to be understood that this is by way of illustration and not of limitation, and the scope of the appended claims should be construed as broadly as the prior art will permit.

What is claimed is:

1. A device for detecting adverse events in a fire hydrant, the device comprising:
   a housing configured to mount to an exterior of the fire hydrant, the housing having a surface with a hole in register with an aperture on the exterior of the fire hydrant;
   a cover enclosing the housing and mounted to the fire hydrant at the surface;
   a controller located within the housing;
   a transceiver operably interconnected with the controller, the transceiver adapted to wirelessly transmit data collected by the device to a remote data collection center; and
   a water sensor coupled to a conduit having a bendable portion and extending through the hole and through the aperture to an adjustable depth within the fire hydrant, the water sensor operably interconnected to the controller.

2. The device of claim 1 wherein the water sensor further includes a probe mounted to a first end of the conduit located at the adjustable depth wherein the probe includes a pair of electrically isolated terminals thereon, which are electrically interconnected when both electrically isolated terminals are simultaneously in contact with water.

3. The device of claim 2 wherein the conduit extends from the probe terminating in a second end coupled to the aperture with a fastener.

4. The device of claim 3 wherein the water sensor includes a spring rod within the bendable conduit configured to keep the bendable conduit straight and stationary when the adjustable depth has reached a desired depth.

5. The device of claim 4 wherein the water sensor comprises a conical body terminating in an apex.

6. The device of claim 5 wherein the electrically isolated terminals are vertically spaced from each other along the conical body.

7. The device of claim 6 wherein the water sensor is co-molded with the electrically isolated terminals such that an interior of the water sensor is fluidly isolated from an exterior of the water sensor.

8. The device of claim 1 wherein the cover is molded from a copolymer material.

9. The device of claim 8 wherein the copolymer material is an ultraviolet resistant acetal copolymer.

10. The device of claim 1 further including a cover tamper sensor.

11. The device of claim 10 wherein the cover tampering sensor comprises a reed switch mounted within the housing and forming a magnetic dipole with a magnet embedded within the cover.

12. The device of claim 11 wherein data indicating the housing cover has been tampered with is sent to a remote location when the magnetic dipole is broken.

13. The device of claim 12 wherein the remote location is a mobile device.

14. The device of claim 1 wherein the housing further includes a housing base mounted to the exterior of the fire hydrant.

15. The device of claim 14 wherein the cover is formed to snap to the housing at the housing base.

16. The device of claim 15 wherein a primary seal is provided between the housing base and the exterior of the fire hydrant.

17. The device of claim 1 wherein the transceiver is a cellular transceiver.

18. The device of claim 17 wherein the cellular transceiver is an embedded cellular modem in communication with the water sensor.

19. The device of claim 18 wherein the embedded cellular modem relays data from the water sensor to a remote location.

20. The device of claim 19 wherein the remote location is a mobile device.

21. The device of claim 1 wherein the fire hydrant is a dry barrel fire hydrant.

22. The device of claim 1 wherein the cover is a color indicative of a flow rate for the fire hydrant.

23. A fire hydrant comprising:
a housing configured to mount to an exterior of the fire hydrant, the housing having a surface in register with the fire hydrant, the surface having an aperture therein;
a cover enclosing the housing and mounted to the fire hydrant at the surface; and
a water sensor coupled to a conduit having a bendable portion and extending from the housing through the aperture to an adjustable depth within the fire hydrant.

24. The fire hydrant of claim 23 wherein the water sensor further includes a probe mounted to a first end of the conduit located at the adjustable depth wherein the probe includes a pair of electrically isolated terminals thereon, which are electrically interconnected when both electrically isolated terminals are simultaneously in contact with water.

25. The fire hydrant of claim 24 wherein the conduit extends from the probe terminating in a second end coupled to the aperture with a fastener.

26. The fire hydrant of claim 25 wherein the water sensor includes a spring rod within the bendable conduit configured to remain stationary when the adjustable depth has reached a desired depth.

27. The fire hydrant of claim 26 wherein the water sensor comprises a conical body terminating in an apex and the electrically isolated terminals are vertically spaced from each other along the conical body.

28. The fire hydrant of claim 27 wherein the water sensor is co-molded with the electrically isolated terminals such that an interior of the water sensor is fluidly isolated from an exterior of the water sensor.

29. The fire hydrant of claim 24 wherein the cover is molded from a copolymer material.

30. The fire hydrant of claim 23 wherein the housing further includes a housing base mounted to the exterior of the fire hydrant and wherein the cover is formed to snap to the housing at the housing base.

31. The fire hydrant of claim 23 further including a cover tamper sensor comprising a reed switch mounted within the housing and forming a magnetic dipole with a magnet embedded within the cover.

32. The fire hydrant of claim 31 wherein data indicating the housing cover has been tampered with is sent to a remote location when the magnetic dipole is broken.

33. The fire hydrant of claim 23 further including an embedded cellular modem within the housing and in communication with the water sensor.

34. The fire hydrant of claim 33 wherein the embedded cellular modem relays data from the water sensor to a remote location.

35. The fire hydrant of claim 34 wherein the remote location is a mobile device.

36. A fire hydrant comprising:
a housing configured to mount to an exterior of the fire hydrant, the housing having a surface with a hole in register with an aperture on the exterior of the fire hydrant;
a water sensor extending from the housing through the aperture to an adjustable depth within the fire hydrant, the water sensor having a spring rod within a bendable conduit configured to remain stationary when at a desired depth.

37. The fire hydrant of claim 36 wherein the water sensor further includes a probe mounted to a first end located at the adjustable depth wherein the probe includes a pair of electrically isolated terminals vertically spaced from each other, which are electrically interconnected when both electrically isolated terminals are simultaneously in contact with water.

38. The fire hydrant of claim 37 wherein the water sensor includes a spring rod within the bendable conduit configured to keep the bendable conduit straight and stationary at the desired depth.

39. The fire hydrant of claim 38 wherein the water sensor comprises a conical body terminating in an apex.

40. The fire hydrant of claim 39 wherein the water sensor is co-molded with the electrically isolated terminals such that an interior of the water sensor is fluidly isolated from an exterior of the water sensor.

* * * * *